(12) United States Patent
Bittner et al.

(10) Patent No.: US 6,260,884 B1
(45) Date of Patent: Jul. 17, 2001

(54) D-LOOP WEB BELT GRIPPER

(75) Inventors: Douglas Wayne Bittner, Indianapolis; Chris P. Jessup, Sheridan, both of IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 09/263,130

(22) Filed: Mar. 5, 1999

(51) Int. Cl.$^7$ .................................................. B60R 22/36
(52) U.S. Cl. .............................................. 280/806; 297/480
(58) Field of Search ................................... 280/806, 808, 280/801.2; 297/480, 483

(56) References Cited

U.S. PATENT DOCUMENTS

| | | | |
|---|---|---|---|
| 3,911,535 | * 10/1975 | Mauron | 24/170 |
| 4,401,281 | 8/1983 | Takada | 242/107.2 |
| 4,422,593 | 12/1983 | Takada | 242/107.2 |
| 4,437,623 | 3/1984 | Wyder | 242/107.2 |
| 4,451,062 | 5/1984 | Ziv | 280/806 |
| 4,466,666 | * 8/1984 | Takada | 297/483 |
| 4,484,766 | * 11/1984 | Buchmeier | 280/808 |
| 4,491,343 | 1/1985 | Föhl | 280/801 |
| 4,544,112 | 10/1985 | Ziv | 242/107.2 |
| 4,615,540 | 10/1986 | Sedlmayr et al. | 280/806 |
| 4,624,422 | 11/1986 | Hollowell | 242/107.2 |
| 4,635,873 | 1/1987 | Takada | 242/107.2 |
| 4,682,791 | 7/1987 | Ernst | 280/806 |
| 4,687,253 | 8/1987 | Ernst et al. | 297/478 |
| 4,718,148 | * 1/1988 | McKernon et al. | 24/170 |
| 4,726,625 | 2/1988 | Bougher | 297/483 |
| 4,840,325 | * 6/1989 | Higuchi et al. | 242/374 |
| 4,928,902 | 5/1990 | Tsuji | 242/107.2 |
| 5,029,790 | 7/1991 | Föhl | 242/107.2 |
| 5,044,575 | 9/1991 | Knabel et al. | 242/107.2 |
| 5,316,339 | * 5/1994 | Lorenz | 280/806 |
| 5,411,292 | * 5/1995 | Collins et al. | 280/806 |

FOREIGN PATENT DOCUMENTS

| | | | |
|---|---|---|---|
| 2 085 709 | 5/1982 | (GB) | A62B/35/02 |
| 2 167 643 | 6/1986 | (GB) | B60R/22/24 |

* cited by examiner

Primary Examiner—Paul N. Dickson
(74) Attorney, Agent, or Firm—Woodard, Emhardt, Naughton, Moriarty & McNett

(57) ABSTRACT

A D-loop web belt gripper to releasably grip a web belt is disclosed. The D-loop web belt gripper includes a frame, a web belt gripping component, and a web belt actuating component. The web belt gripping component is a wedge having a plurality of web belt gripping teeth spatially biased away from a base member of the frame. The web belt actuating components is a bail having a lever arm, a pair of guide walls pivotally adjoined to a pair of guide walls of the frame, and a pair of drivers abutting the wedge. A first portion of a web belt is disposable between the web belt gripping teeth and the base member of the frame, and a second portion of the web belt is arcuately disposable upon the lever arm to form an arcuation in the second portion of the web belt. A forcible unbending of the arcuation in the second portion of the web belt can pivot the bail via the lever arm causing the drivers of the bail to displace the web belt gripping teeth of the wedge in the direction of the base member of the frame.

11 Claims, 16 Drawing Sheets

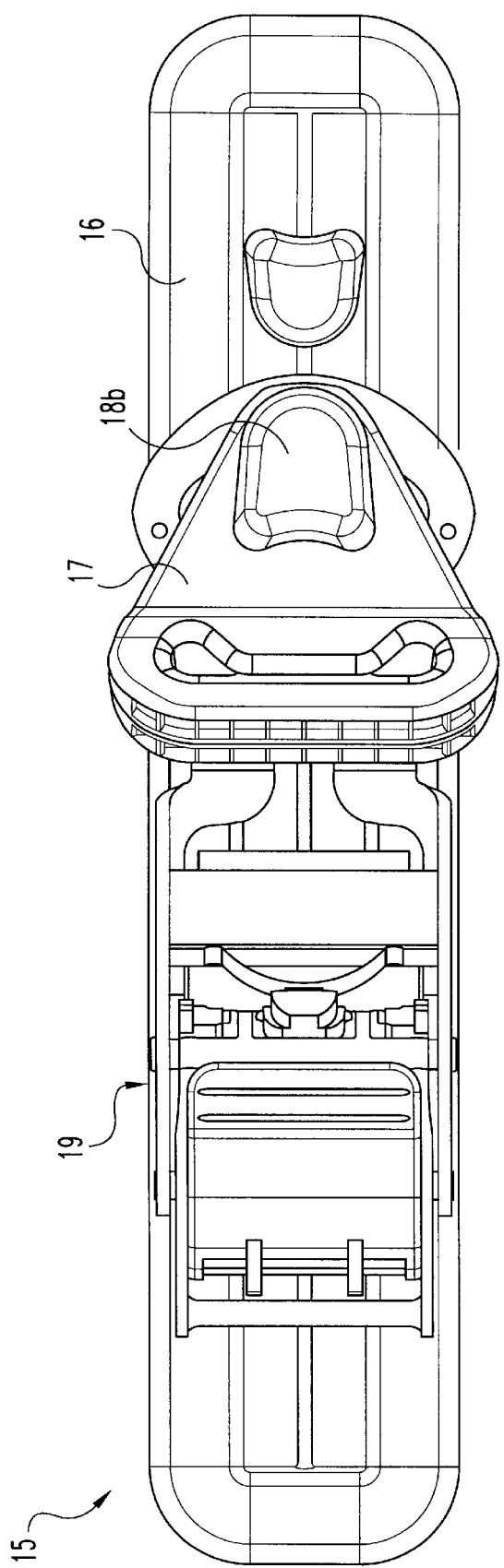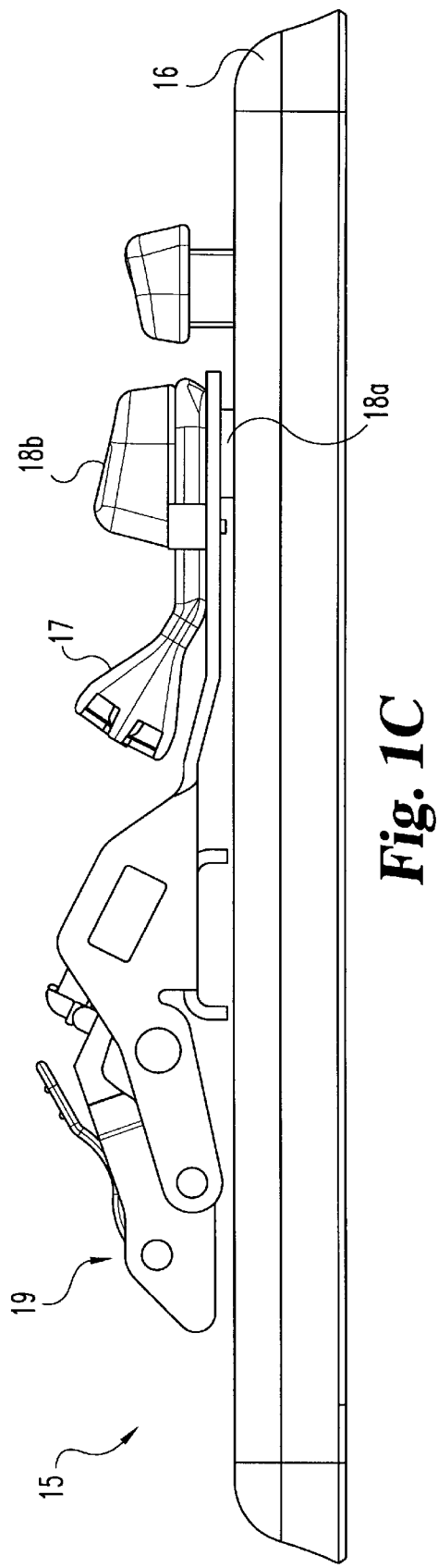
*Fig. 1B*
*Fig. 1C*

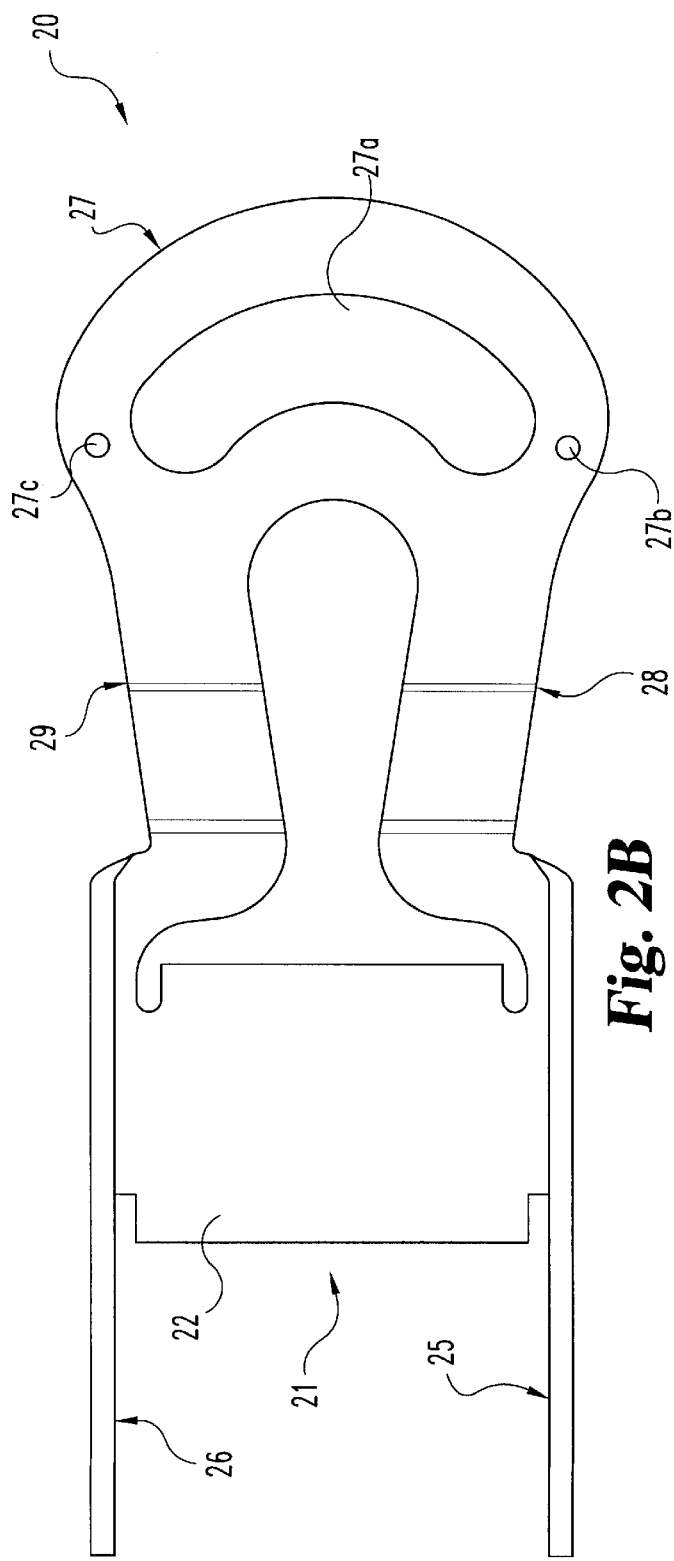
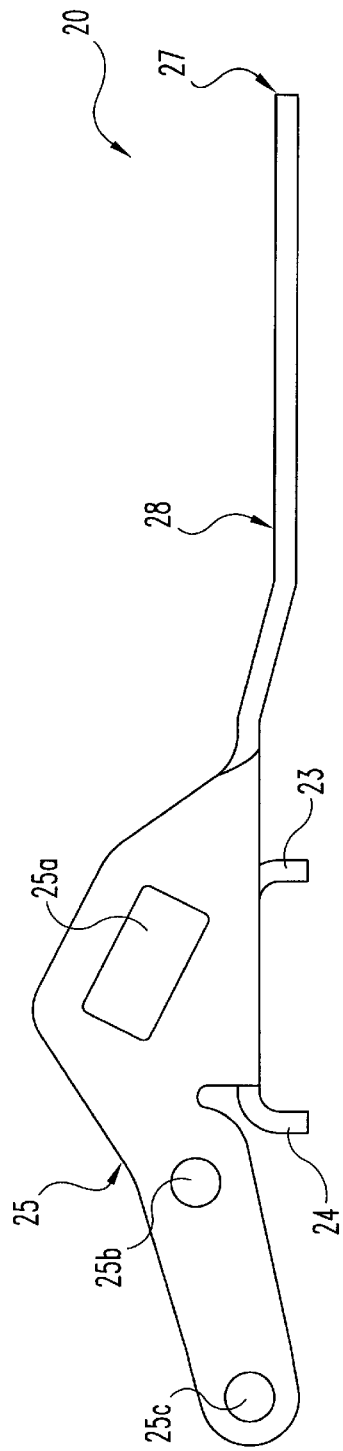
Fig. 2B
Fig. 2C

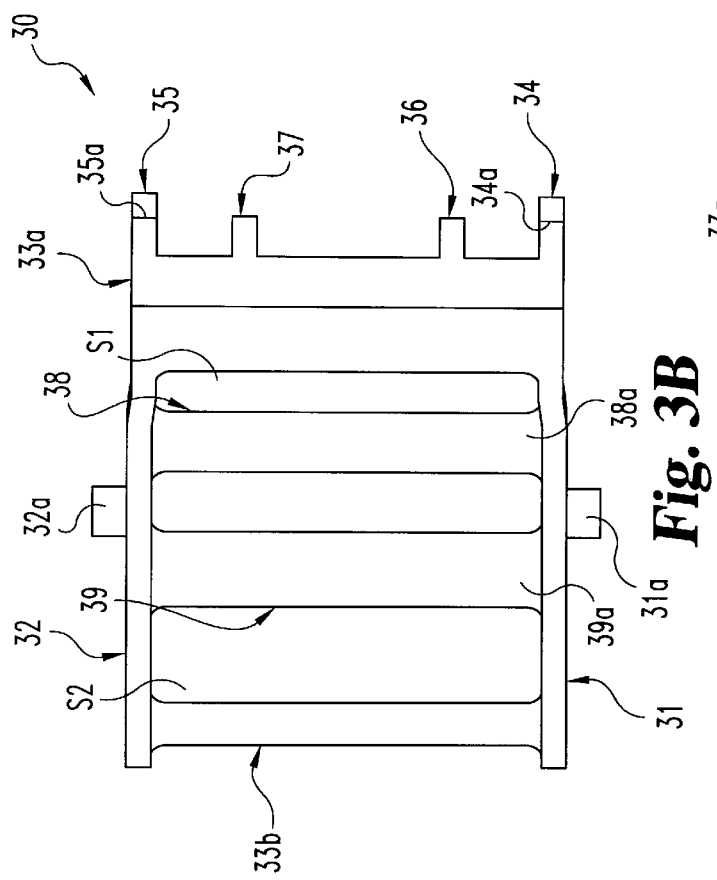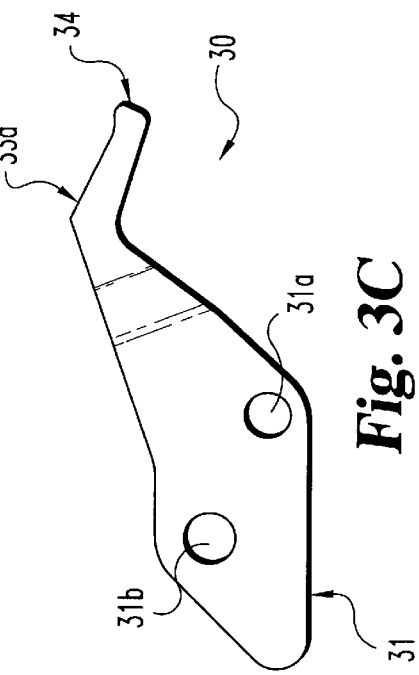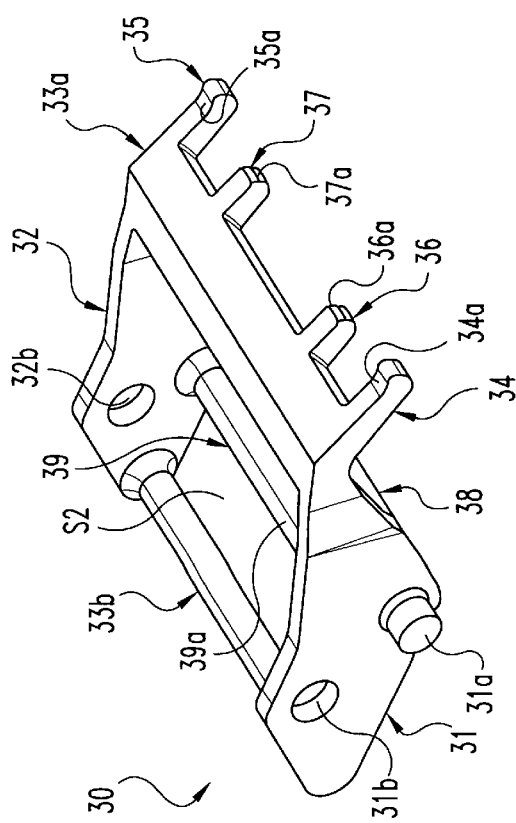

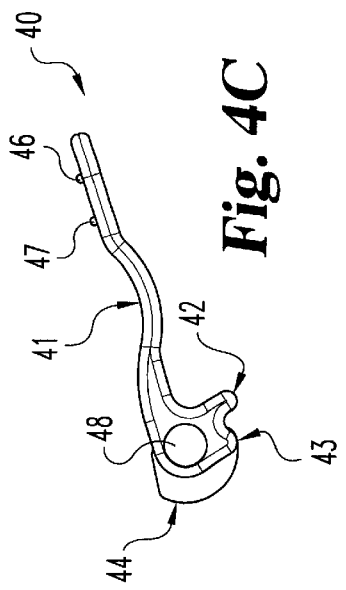
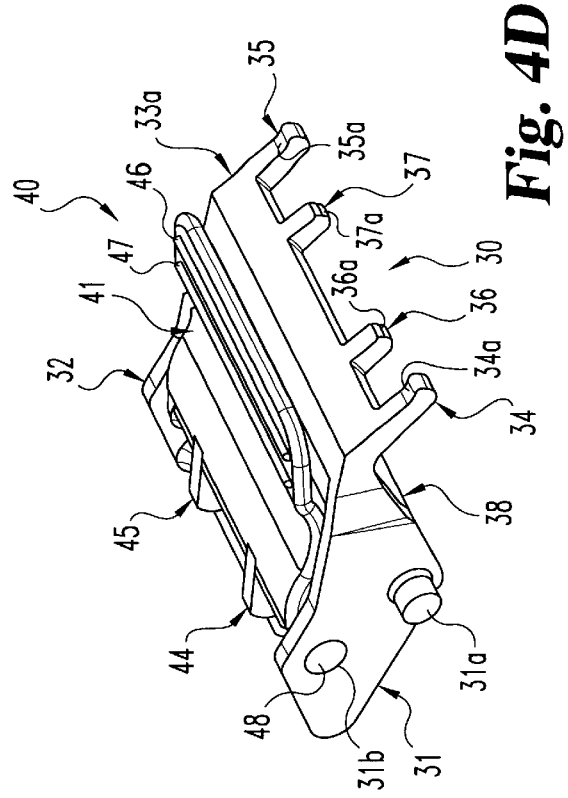
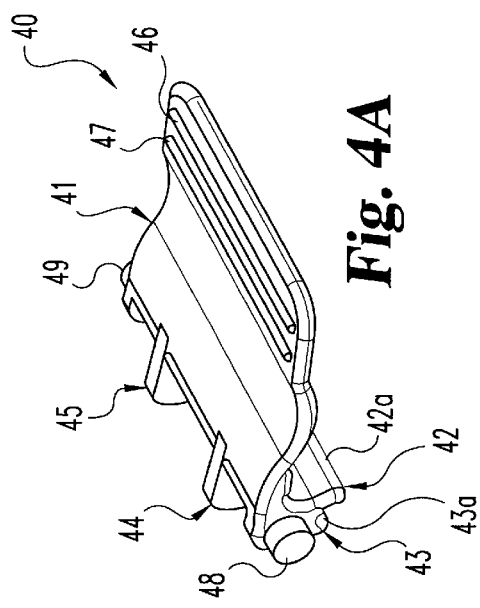
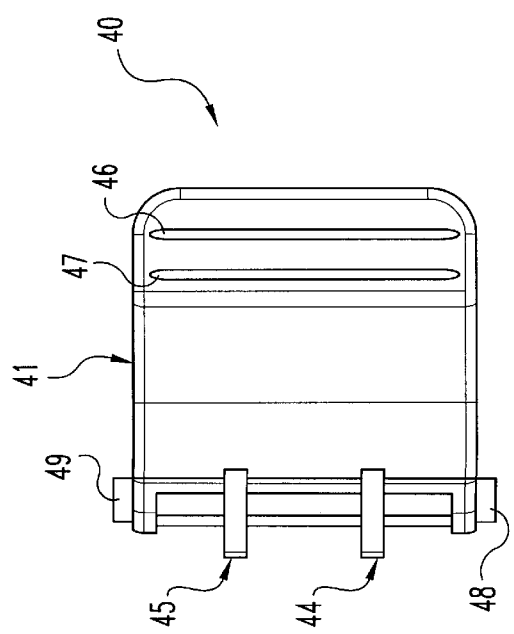

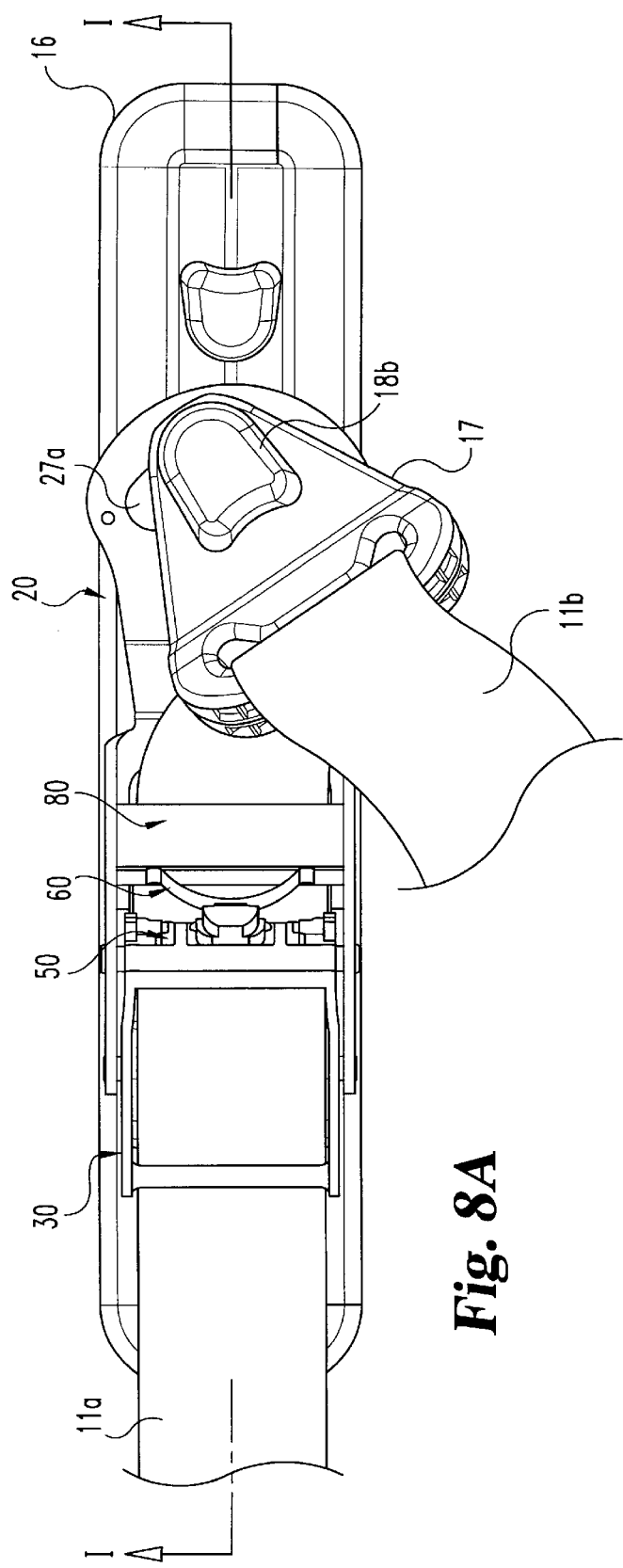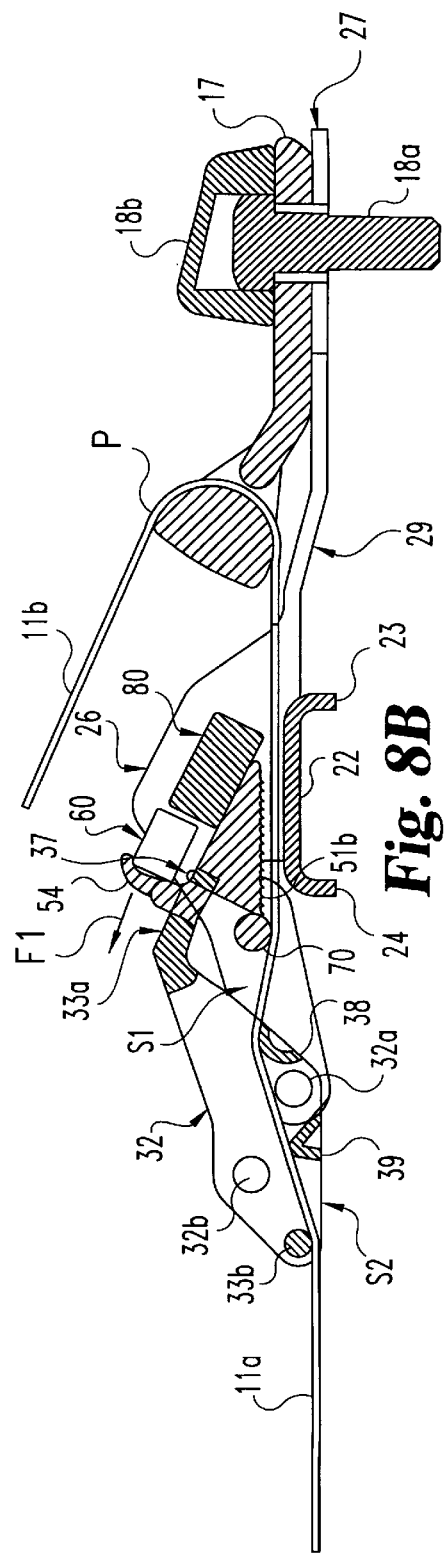
Fig. 8A
Fig. 8B

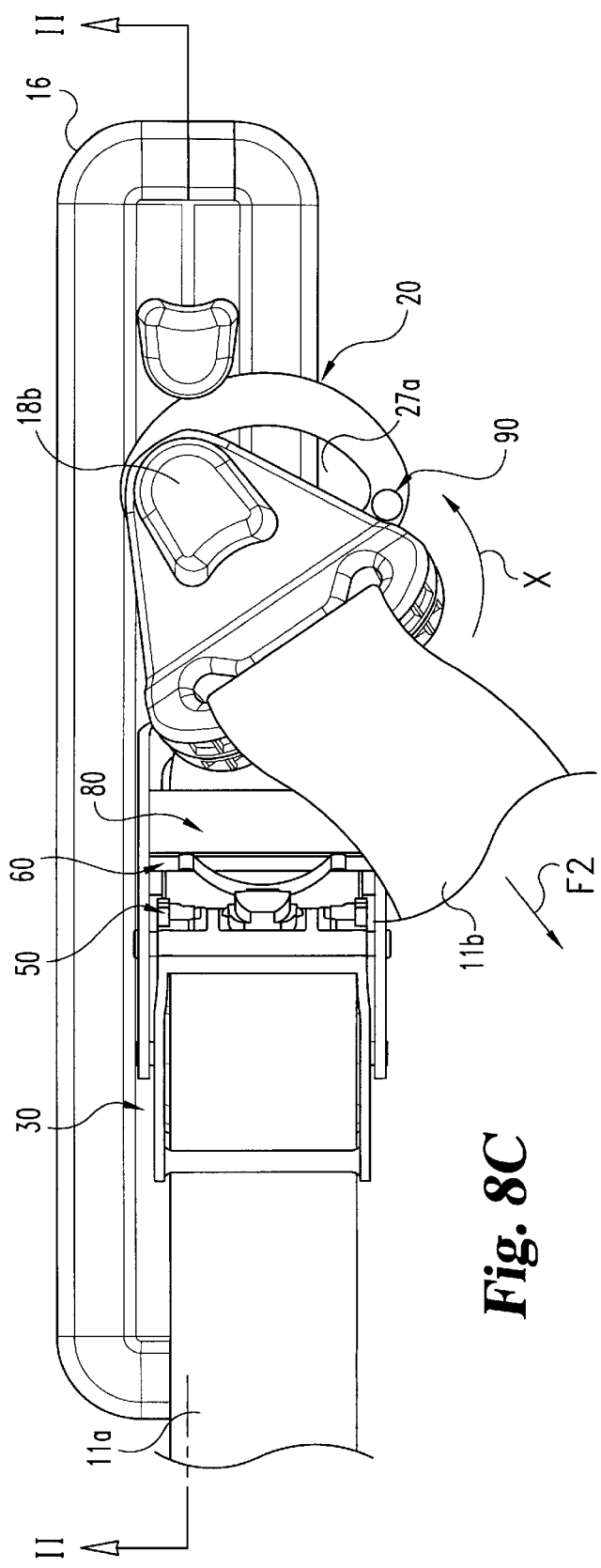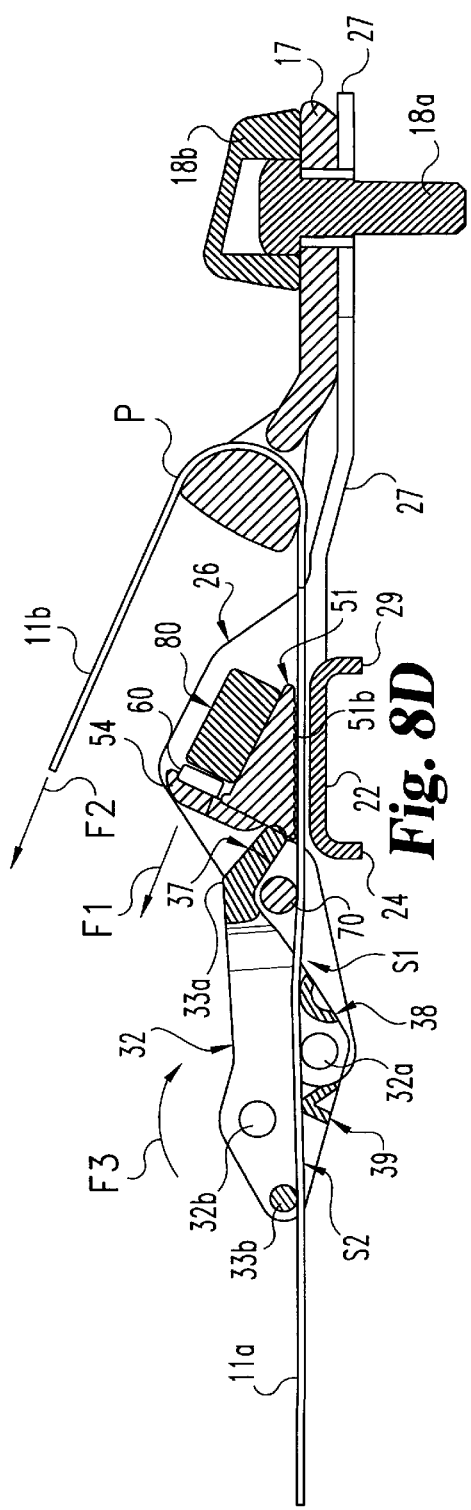

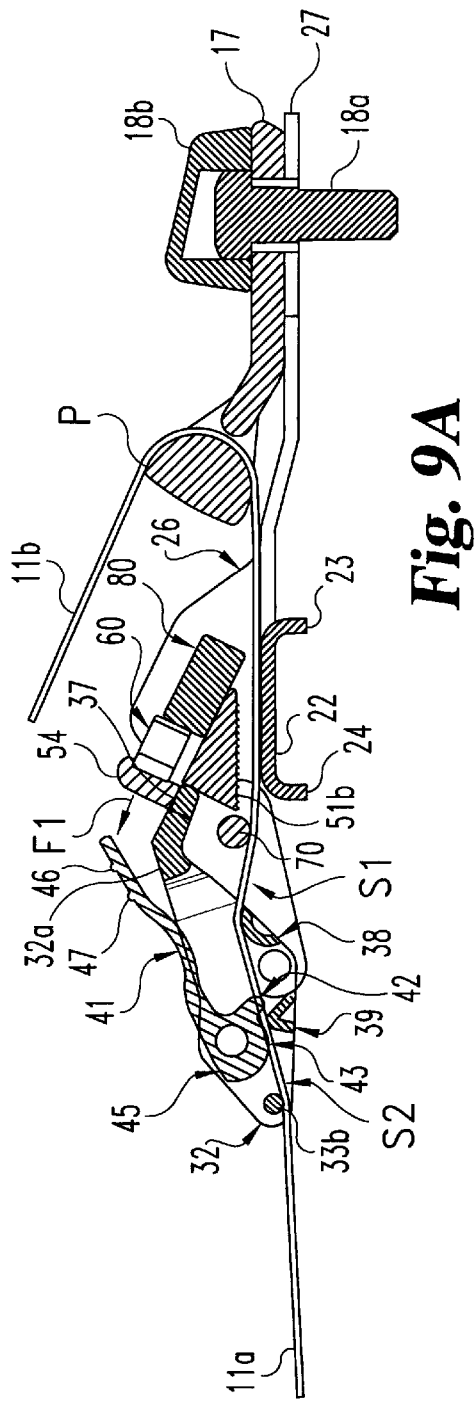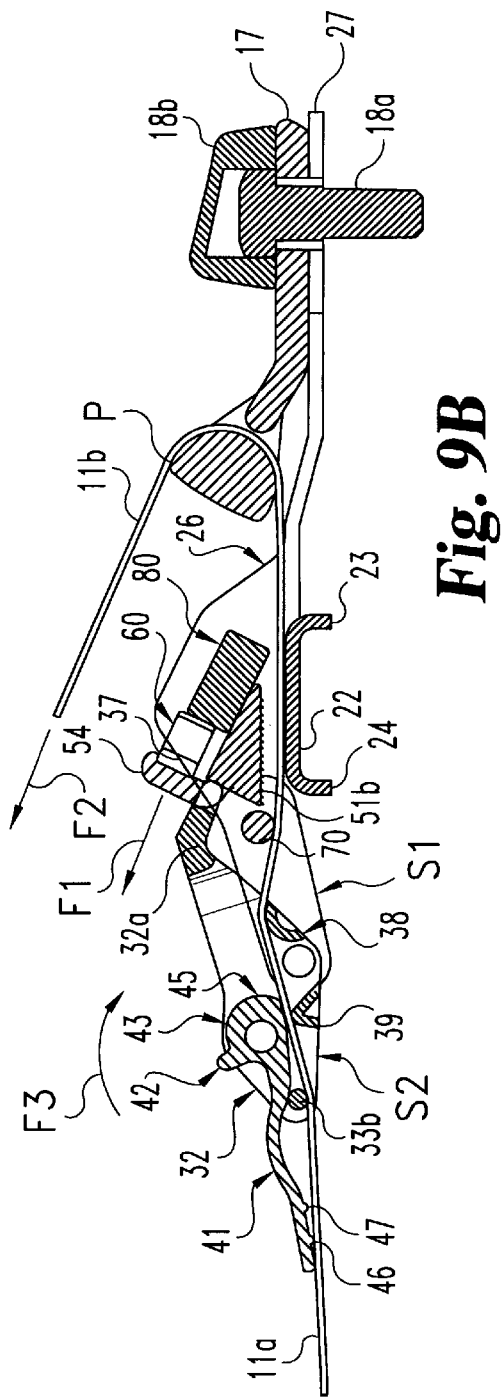

D-LOOP WEB BELT GRIPPER

BACKGROUND OF THE INVENTION

1. The Field of the Invention

The present invention relates generally to the field of seat belt restraining systems, and more specifically, to a device that is useful to grip a web belt of a three point belt restraining system in response to a load being applied to the web belt.

2. Background Art

A standard three point belt system includes a retractor, and a web belt having one end that is attached to and wound around a shaft of the retractor, and another end that is attached to a component of a vehicle, e.g. a seat, a floor, etc. The retractor and the web belt are designed to decelerate the forward acceleration of a restrained occupant in an attempt to impede any forward displacement of the restrained occupant. However, as a load is applied to the web belt by a forwardly accelerating restrained occupant, the retractor shaft will lock and a portion of the web belt will spool off of the locked retractor shaft. Concurrently, the web belt will begin to stretch over a substantial portion of its length. Presently, three point belt systems may further comprise or the retractor may further include a clamping device to reduce the amount of web spooling and/or web stretch in response to a load being applied to the web belt. Such clamping devices are disclosed in U.S. Pat. No. 4,401,281; U.S. Pat. No. 4,422,593; U.S. Pat. No. 4,437,623; U.S. Pat. No. 4,451,062; U.S. Pat. No. 4,491,343; U.S. Pat. No. 4,544,112; U.S. Pat. No. 4,615,540; U.S. Pat. No. 4,624,422; U.S. Pat. No. 4,635,873; U.S. Pat. No. 4,682,791; U.S. Pat. No. 4,687,253; U.S. Pat. No. 4,928,902; U.S. Pat. No. 5,029,769; U.S. Pat. No. 5,044,575; UK Patent No. 2 085 709; and UK Patent No. 2 167 643. While such prior clamping devices are an improvement over a standard three point belt system, there is still a need to further reduce the amount of web spooling and the amount of web stretch when a load is being applied to a web belt.

SUMMARY OF THE INVENTION

The present invention is a D-loop web belt gripper that addresses the aforementioned drawbacks associated with a standard three point belt assembly. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

In accordance with the present invention, a web belt gripper for installation in a vehicle including a belt restraining system having a web belt comprises a frame and a web belt gripping component. The frame is mountable to the vehicle and includes a base member. The web belt gripping component is spatially biased from the base member of the frame. A first portion of the web belt is disposable between the web belt gripping component and the base member of the frame. The web belt gripper further comprises a web belt actuating component. The web belt actuation component is movably adjoined to the frame, and adjoined to the web belt gripping component. A second portion of the web belt is arcuately disposable upon the web belt actuating component to form an arcuation in the second portion of the web belt. When a forcible tension is applied to the second portion of the web belt to unbend the arcuation, the web belt actuating component moves causing the web belt gripping component to be displaced in a direction of the base member of the frame.

It is an object of the present invention to minimize an increase in the length of a web belt that is under a significant load to thereby minimize the effect that web spooling has on the forward displacement of a restrained occupant.

A further object of the present invention is to sectionally limit a stretching of a web belt under a significant load to thereby minimize the effect that web stretching has on the forward displacement of a restrained occupant.

Related objects and advantages of the present invention will be apparent from the following description of the preferred embodiment.

BRIEF DESCRIPTION OF THE DRAWINGS

FIG. 1B is a top view of a preferred embodiment of an adjustable D-loop mechanism of FIG. 1A.

FIG. 1C is a left side view of FIG. 1B.

FIG. 2B is a top view of the frame of FIG. 2A.

FIG. 2C is a left side view of the frame of FIG. 2A.

FIG. 3A is a front perspective view of a preferred embodiment of a web belt actuating component of the D-loop web belt gripper of FIGS. 1A–1C.

FIG. 3B is a top view of the web belt actuating component of FIG. 3A.

FIG. 3C is a left side view of the web belt actuating component of FIG. 3A.

FIG. 4A is a front perspective view of a preferred embodiment of a latch of the D-loop web belt gripper of FIGS. 1A–1C.

FIG. 4B is a top view of the latch of FIG. 4A.

FIG. 4C is a left side view of the latch of FIG. 4A.

FIG. 4D is a perspective view of an assembly of the web belt actuating component of FIGS. 3A–3C and the latch of FIGS. 4A–4C in a web belt locking position.

FIG. 8A is a top view of the assembly of FIG. 7C in a web belt release position.

FIG. 8B is a cross-sectional view of FIG. 8A taken along line I—I in the direction of the arrows.

FIG. 8C is a top view of the assembly of FIG. 7C in a web belt gripping position.

FIG. 8D is a cross-sectional view of FIG. 8C taken along line II—II in the direction of the arrows.

FIG. 9A is a cross-sectional view of the assembly of FIG. 7D in a web belt locking position taken along line III—III in the direction of the arrows.

FIG. 9B is a cross-sectional view of the assembly of FIG. 7D in a web belt release position taken along line III—III in the direction of the arrows.

DESCRIPTION OF THE PREFERRED EMBODIMENT

Figure 1A:
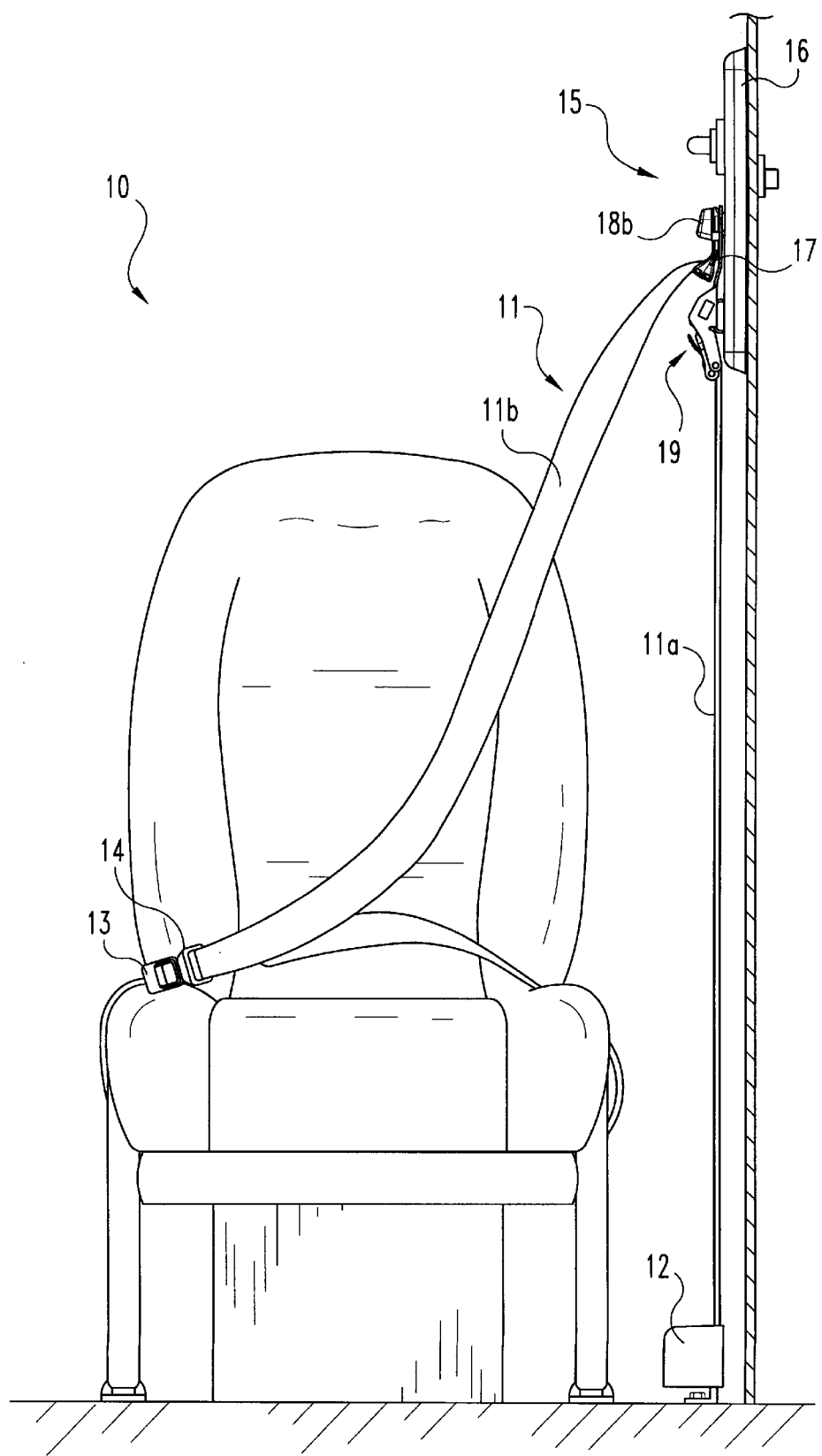
FIG. 1A is a front view of a three point belt system incorporating the present invention.

For the purposes of promoting an understanding of the principles of the present invention, reference will now be made to the preferred embodiment of the present invention as illustrated in the drawings and specific language will be used to describe the same. It will nevertheless be understood that no limitation of the scope of the present invention is thereby intended. Any alterations and further modifications in the illustrated embodiments, and any further applications of the principles of the present invention as illustrated and described herein are contemplated as would normally occur to one skilled in the art to which the present invention relates.

Referring now to FIGS. 1A–1C, a three point belt system 10 incorporating the present invention is shown. Three point belt system 10 conventionally comprises a web belt 11, a retractor 12 mounted to a vehicle floor, a web belt buckle 13 attached to a vehicle seat, and a web belt tongue 14 releasably lockable within web belt buckle 13. Three point belt system 10 further comprises an adjustable D-loop mechanism 15 in accordance with the present invention. Adjustable D-loop mechanism 15 includes a conventional mounting bracket 16 mounted to a vehicle wall, a conventional D-loop 17 adjoined to mounting bracket 16 via a vertically adjustable bolt 18a and a fastener 18b, and a new and unique D-loop web belt gripper 19 also adjoined to mounting bracket 16 via vertically adjustable bolt 18a and fastener 18b. For purposes of the present invention, the term adjoined is broadly defined as an unitary fabrication, an affixation, a detachable coupling, an engagement, an engagable arrangement, or an abutment of a first article and a second article, e.g. a detachable coupling of D-loop 17 and D-loop web belt gripper 19 to vertically adjustable bolt 18a and fastener 18b as shown. Also for purposes of the present invention, web belt 11 has a first web belt section 11a, and a second web belt section 11b. First web belt section 11a is defined as the variable length of web belt 11 mounted to and upwardly extending from a shaft (not shown) of retractor 12, and slidably through D-loop web belt gripper 19. Second web belt section 11b is defined as the variable length of web belt 11 upwardly extending from D-loop web belt gripper 19 and slidably through D-loop 17, and then downwardly extending therefrom across a backrest and a seat cushion of the vehicle seat and attached to the vehicle seat as shown (or alternatively to the vehicle floor) with second belt section 11b being slidably passable through a slot of belt tongue 14.

Still referring to FIG. 1A, when a substantial load is applied to web belt section 11b, any variance in the length of web belt section 11b is a function of the extent of web spooling of web belt section 11a from a locked shaft (not shown) of retractor 12, and to the extent of web stretch of web belt 11. By promptly isolating web belt section 11a from web belt section 11b upon the loading of web belt section 11b as further described herein in connection with FIGS. 8D and 9C, and accompanying text, D-loop web belt gripper 19 minimizes an increase in the length of second web belt section 11b due to web spooling of web belt 11 to thereby minimize the effect of web spooling on the forward displacement of a restrained occupant, and D-loop web belt gripper 19 concurrently sectionally limits the load to second web belt section 11b to thereby reduce the overall web stretch of web belt 11. As a result, the forward movement of web belt section 11b is more restricted than with a standard three point belt system, and therefore the forward acceleration of the restrained occupant is decelerated much faster than with a standard three point belt system. Consequently, the forward displacement of the restrained occupant is effectively impeded in most moderate to high load situations.

Figure 2A:
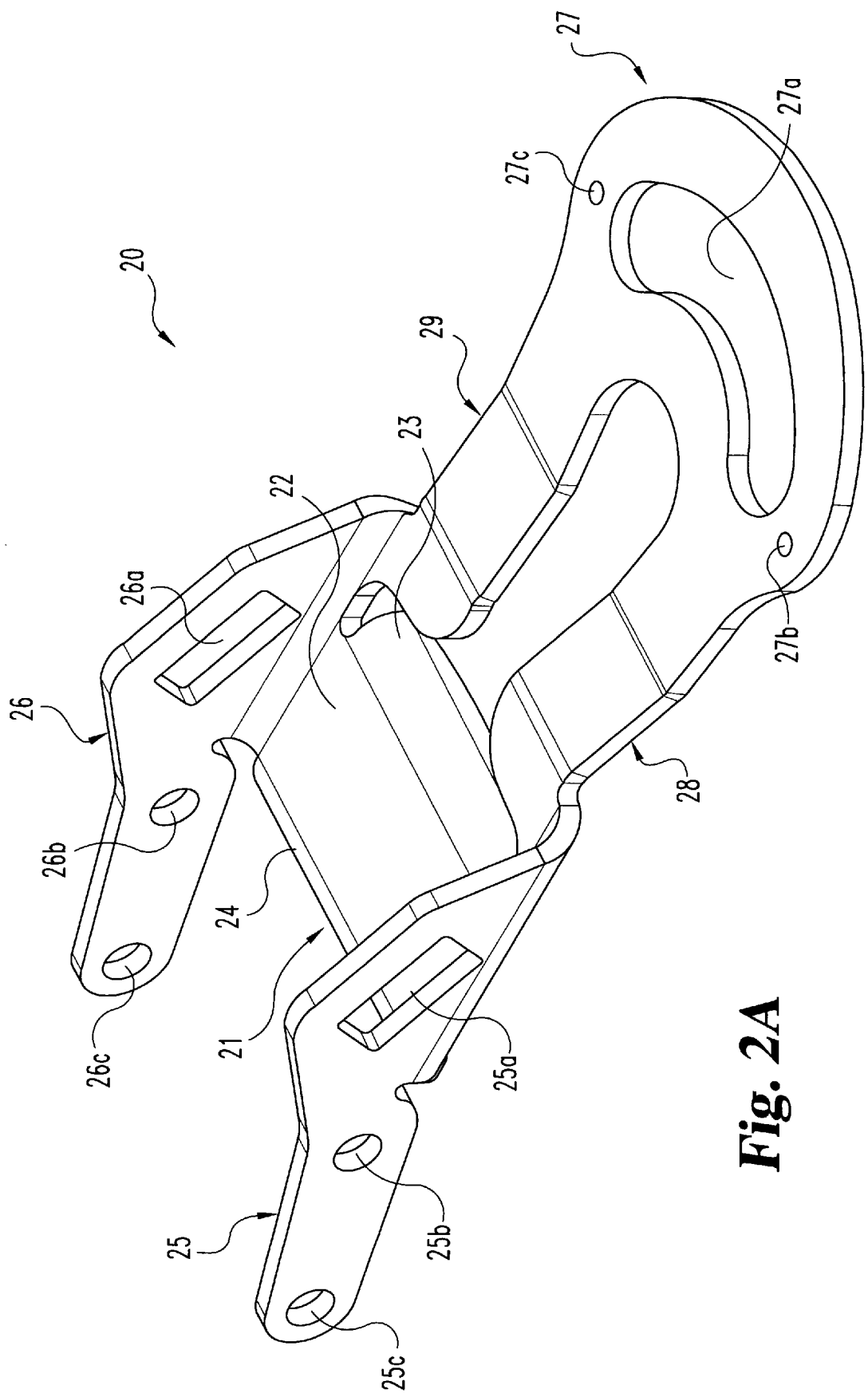
FIG. 2A is a front perspective view of a preferred embodiment of a frame of a D-loop web belt gripper of FIGS. 1A–1C.
Figure 9C:
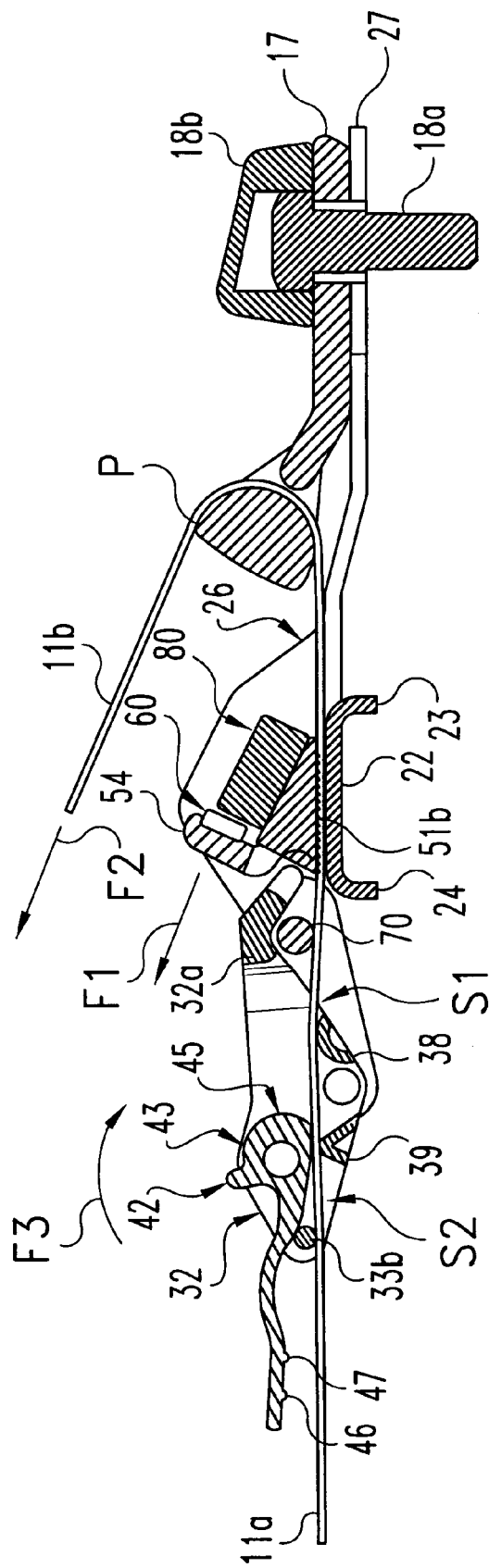
FIG. 9C is a cross-sectional view of the assembly of FIG. 7D in a web belt gripping position taken along line III—III in the direction of the arrows.

Referring now to FIGS. 2A–2C, a preferred embodiment of a frame 20 of D-loop web belt gripper 19 is shown in detail. The preferred embodiment of frame 20 is given solely for purposes of describing the best mode of the present invention and is not meant to be limiting in any way. Frame 20 includes a base member 21 having a center section 22, a front end section 23, and a rear end section 24. Center section 22 supports web belt section 11a of web belt 11 (FIG. 1A) when a significant load is applied to web belt section 11b of web belt 11 (FIG. 1A) as illustrated in FIGS. 8D and 9C. Front end section 23 is laterally adjoined to a front surface of center section 22, and is downwardly extended at a right angle from a top surface of center section 22. Rear end section 24 is laterally adjoined to a rear surface of center section 22, and is downwardly extended at a right angle from the top surface of center section 22. Front end section 23 and rear end section 24 are symmetrically configured, and symmetrically aligned. Front end section 23 and rear end section 24 reinforce center section 22 when a significant load is applied to web belt section 11b of web belt 11 to thereby prevent center section 22 from bending or deflecting.

Figure 6B:
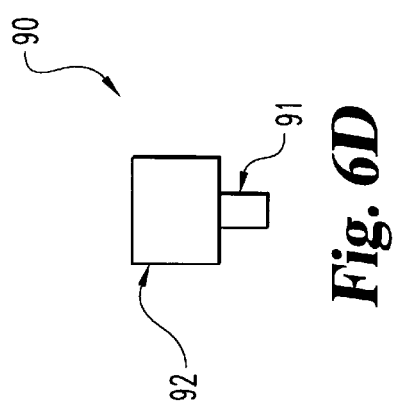
FIG. 6B is a perspective view of a preferred embodiment of a support pin of the D-loop web belt gripper of FIGS. 1A–1C.

Still referring to FIGS. 2A–2C, frame 20 further includes a left guide wall 25, and a right guide wall 26. A front end of left guide wall 25 is laterally adjoined to a left side surface of center section 22, and left guide wall 25 upwardly extends at a right angle from the top surface of center section 22. A front end of right guide wall 26 is laterally adjoined to a right side surface of center section 22, and right guide wall 26 upwardly extends at a right angle from the top side surface of center section 22. Left guide wall 25 and right guide wall 26 are symmetrically configured and symmetrically aligned. Left guide wall 25 and right guide wall 26 collectively align and guide web belt section 11a of web belt 11 (FIG. 1A) over center portion 22 as illustrated in FIGS. 8A–8D, and 9A–9C. Left guide wall 25 has a rectangular slot 25a disposed in the front end of left guide wall 25, a circular hole 25b disposed in the middle section of left guide wall 25, and a circular hole 25c disposed in a rear end of left guide wall 25. Right guide wall 26 has a rectangular slot 26a disposed in the front end of right guide wall 26, a circular hole 26b disposed in the middle section of right guide wall 26, and a circular hole 26c disposed in a rear end of right guide wall 26. Slot 25a and slot 26a receive a reactor bar 80 (FIG. 6C) as illustrated in FIG. 7C. Hole 25b and hole 26b receive a support pin 70 (FIG. 6B) as illustrated in FIG. 7A. Hole 25c and hole 26c receive a circular tab 31a and a circular tab 32b, respectively, of a bail 30 (FIGS. 3A–3C) as illustrated in FIG. 7A.

Figure 6D:
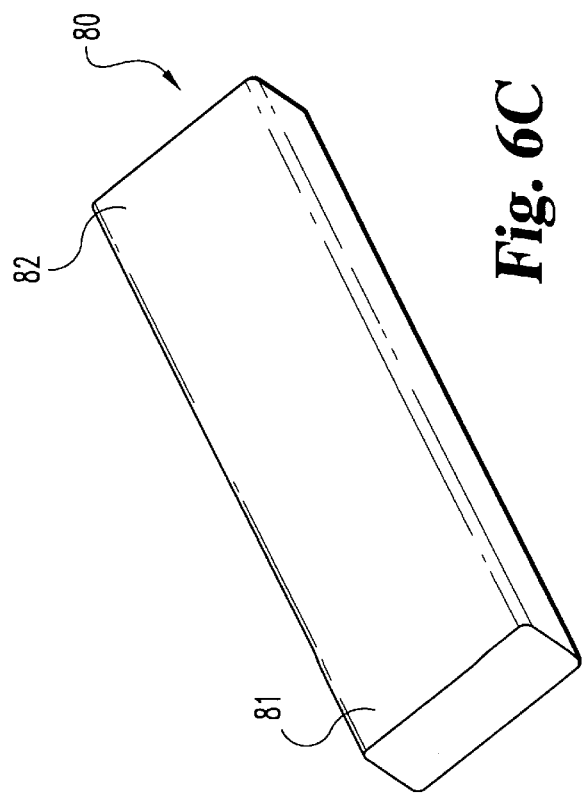
FIG. 6D is a side view of a preferred embodiment of guide pin of the D-loop web belt gripper of FIGS. 1A–1C.
Figure 7A:
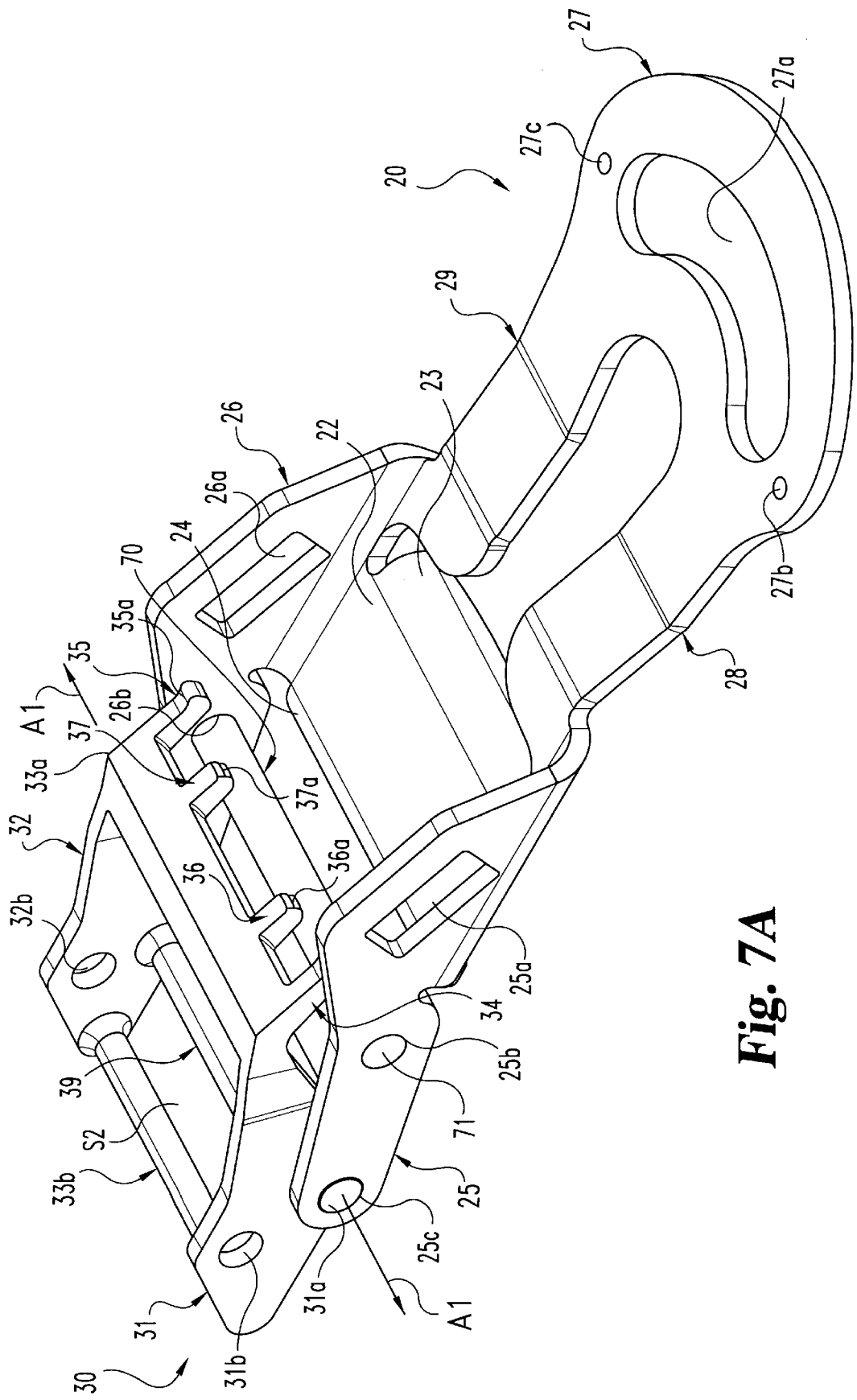
FIG. 7A is a front perspective view of an assembly of the frame of FIGS. 2A–2C, the web belt actuating component of FIGS. 3A–3C, and the support pin of FIG. 6B.

Still referring to FIGS. 2A–2C, frame 20 further includes a catenary shaped oscillating member 27. Oscillating member 27 has a catenary shaped slot 27a dimensioned to receive vertically adjustable bolt 18a (FIG. 1C) therein as illustrated in FIGS. 8A and 8C. Oscillating member 27 further has a circular hole 27b adjacent a left end of slot 27a, and a circular hole 27c adjacent a right end of slot 27a. Hole 27b or hole 27c receives a guide pin 90 (FIG. 6D) as illustrated in FIG. 7D. Frame 20 further includes a first beam 28, and a second beam 29. A front end of beam 28 is laterally adjoined to a left end of a rear side surface of oscillating member 27, and is horizontally extended therefrom. A rear end of beam 28 is laterally adjoined to an inner side surface of the front end of left guide wall 25, and is horizontally aligned with center section 22 of base member 21. A middle section of beam 28 upwardly extends from the front end of beam 28 to the rear end of beam 28 as best shown in FIG. 2C. A front end of beam 29 is laterally adjoined to a left end of a rear side surface of oscillating member 27, and is horizontally extended therefrom. A rear end of beam 29 is laterally adjoined to an inner side surface of the front end of right guide wall 26, and is horizontally aligned with center section 22 of base member 21. A middle section of beam 29 upwardly extends from the front end of beam 29 to the rear end of beam 29. Beam 28 and beam 29 are symmetrically configured and symmetrically aligned. Beam 28 and beam 29 are spaced to defined a gap therebetween. Alternatively, beam 28 and beam 29 can be adjoined, e.g. unitarily fabricated.

Preferably, center section 22, front end section 23, rear end section 24, left guide wall 25, right guide wall 26, oscillating member 27, beam 28 and beam 29 are unitarily fabricated. In such cases, the present invention contemplates that frame 20 can be made from a variety of suitable materials. Preferably, frame 20 would be made from reinforced steel.

D-loop web gripper 19 further comprises a web gripping actuating component movably mounted to frame 20, e.g. pivotally mounted, rotatably mounted, or slidably mounted. Referring now to FIGS. 3A–3C, a preferred embodiment of a bail 30 as a web belt actuating component of D-loop web belt gripper 19 is shown in detail. The preferred embodiment of bail 30 is given solely for purposes of describing the best mode of the present invention and is not meant to be limiting in any way. Bail 30 includes a left guide wall 31, and a right guide wall 32. Left guide wall 31 and right guide wall 32 align and guide web belt section 11a of web belt 11 (FIG. 1A) as illustrated in FIGS. 8A–8D, and 9A–9C. Left guide wall 31 and right guide wall 32 are symmetrically configured and symmetrically aligned. Left guide wall 31 has a circular tab 31a outwardly extended from a lower portion of a front end of left guide wall 31, and a circular hole 31b disposed in an upper portion of a rear end of left guide wall 31. Right guide wall 32 has a circular tab 32a outwardly extended from a lower portion of a front end of right guide wall 32, and a circular hole 32b disposed in an upper portion of a rear end of right guide wall 32. Tab 31a and tab 32a are sized to rotatably fit within hole 25c of left guide wall 25 (FIGS. 2A and 2C) and hole 26c of right guide wall 26 (FIG. 2A), respectively, as illustrated in FIG. 7A. Hole 31b and hole 32b receive a tab 48 and a tab 49 of a latch 40 (FIGS. 4A–4C), respectively, as illustrated in FIG. 4D.

Figure 5B:
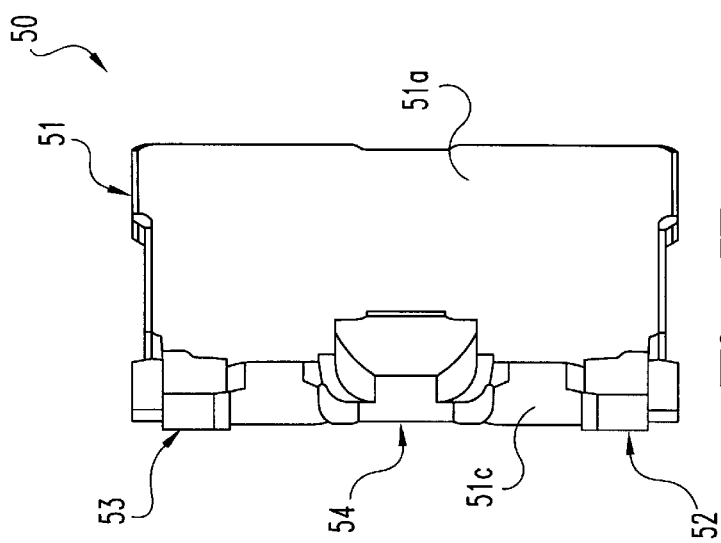
FIG. 5B is a top view of the web belt gripping component of FIG. 5A.
Figure 5C:
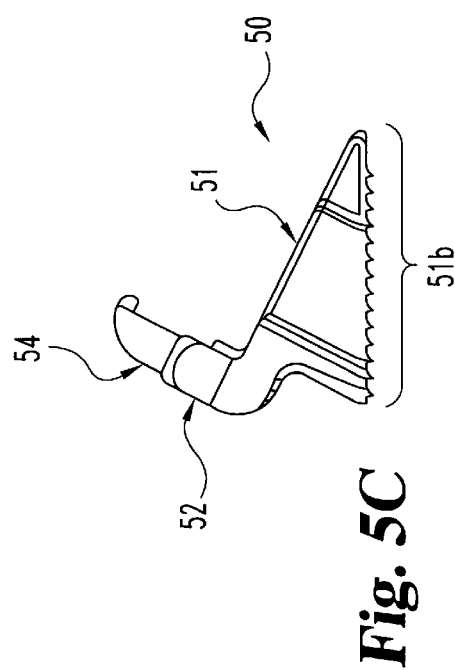
FIG. 5C is a left side view of the web belt gripping component of FIG. 5A.
Figure 5A:
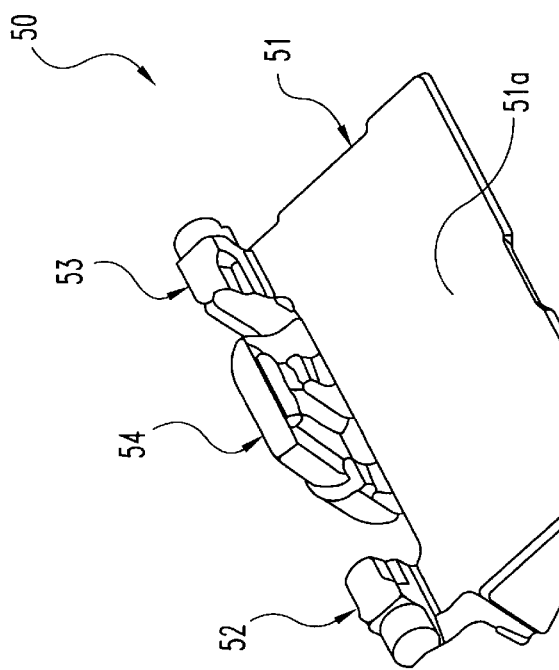
FIG. 5A is a front perspective view of a preferred embodiment of a web belt gripping component of the D-loop web belt gripper of FIGS. 1A–1C.

Still referring to FIGS. 3A–3C, bail 30 further includes front support member 33a having a substantial angle iron shape, a left support arm 34, a right support arm 35, a left driver 36, and a right driver 37. A left end of front support member 33a is adjoined to a top portion of the front end of left guide wall 31, and a right end of front support member 33a is adjoined to a top portion of the front end of right guide wall 32. A top surface of front support member 33a contingently supports latch 40 (FIGS. 4A–4C). A bottom surface of front support member 33a can engage support pin 70 (FIG. 6B). Left support arm 34 is adjoined to a left end of a front surface of front support member 33a. Left support arm 34 initially downwardly extends therefrom and then upwardly extends to form a notch 34a. Right support arm 35 is adjoined to a right end of the front surface of front support member 33a. Right support arm 35 initially downwardly extends therefrom and then upwardly extends to form a notch 35a. Left support arm 34 and right support arm 35 are symmetrically configured and symmetrically aligned. Notch 34a and notch 35a can engage a left suspension arm 52 and a right suspension arm 53 of a wedge 50 (FIGS. 5A–5C) to thereby support wedge 50 in a web belt release position illustrated FIG. 7B. Left driver 36 is adjoined to a middle section of the front surface of front support member 33a. Left driver 36 initially downwardly extends therefrom and then upwardly extends to form a driving surface 36a. Right driver 37 is adjoined to the middle section of the front surface of front support member 33a and spaced from left driver 36. Right driver 37 initially downwardly extends therefrom and then upwardly extends to form a driving surface 37a. Left driver 36 and right driver 37 are symmetrically configured and symmetrically aligned. Driving surface 36a and driving surface 37a contingently apply a downward and forward force on a rear surface of a base member 51 of wedge 50 (FIGS. 5A–5C) to thereby move wedge 50 from the web belt release position as illustrated in FIGS. 8B and 9B to a web belt gripping position as illustrated in FIGS. 8D and 9C. Still referring to FIGS. 3A–3C, bail 30 further includes a front lever arm 38 having a semi-circular cylindrical shape, a rear lever arm 39 having a semi-angle iron shape, and a rear support member 33b having a cylindrical shape. A left end of front lever arm 38 is adjoined to a middle portion of the front end of left guide wall 31, and a right end of front lever arm 38 is adjoined to a middle portion of the front end of right guide wall 32 to define a slot S1 between front support member 33 and front lever arm 38. A left end of rear lever arm 39 is adjoined to a lower portion of the middle section of left guide wall 31, and a right end of rear lever arm 39 is adjoined to a lower portion of the middle section of right guide wall 32. A right end of rear support arm 33b is adjoined to a lower portion of the rear end of left guide wall 31, and a right end of rear support arm 33b is adjoined to a lower portion of the rear end of right guide wall 32 to define a slot S2 between rear support member 33b and rear lever arm 39. Web belt section 11a of web belt 11 (FIG. 1A) is received within slot S1 and slot S2 as further illustrated in FIGS. 8B, 8D, and 9A–9C. A bottom surface of web belt section 11a of web belt 11 is disposable upon a pivoting surface 38a of front lever arm 38 and disposable upon a pivoting surface 39a of rear lever arm 39 to thereby pivot left driver 36 and right driver 37 in a downward and forward direction as a function of a significant load being applied to web belt section 11b of web belt 11 (FIG. 1A) as further described herein in connection with FIGS. 8D and 9C, and accompanying text. Rear support member 33b can support latch 40 (FIGS. 4A–4C) as illustrated in FIG. 9B.

Preferably, left guide wall 31, tab 31a, right guide wall 32, tab 32a, support member 33a, left support arm 34, right support arm 35, left driver 36, right driver 37, front lever arm 38, rear lever arm 39, and rear support member 33b are unitarily fabricated. In such cases, the present invention contemplates that bail 30 can be made from a variety of suitable materials. Preferably, bail 30 would be made from a durable plastic material.

Referring now to FIGS. 4A–4C, a preferred embodiment of latch 40 of D-loop web belt gripper 19 in accordance with U.S. Pat. No. 4,726,625, hereby incorporated by reference, is shown in detail. The preferred embodiment of latch 40 is given solely for purposes of describing the best mode of the present invention and is not meant to be limiting in any way. Latch 40 includes a contoured support member 41, a first cam 42, and a second cam 43. Cam 42 is adjoined to a bottom surface of a rear end of support member 41, and downwardly and forwardly extends therefrom. Cam 43 is adjoined to the bottom surface of the rear end of support member 41 rearward of cam 42, and downwardly extends therefrom. Cam 43 has a locking surface 43a to releasably engage web belt section 11a of web belt 11 (FIG. 1A) and cam 42 has a release surface 42a to release web belt section 11a from an engagement with locking surface 43a as further described herein in connection with FIGS. 9A and 9B. Latch 40 further includes a third cam 44, and a fourth cam 45. Cam 44 is adjoined to a rear surface of the rear end of support member 41, and rearwardly extended therefrom. Cam 45 is adjoined to the rear surface of the rear end of support member 41, and rearwardly extended therefrom. Cam 44 and cam 45 are spaced along a middle section of the rear surface of the rear end of support member 41. Cam 44 and cam 45 are also symmetrically configured and symmetrically aligned. Cam 44 and cam 45 pivot cam 42 and cam 43 away from web belt section 11a of web belt 11 as further described herein in connection FIG. 9B and accompanying text.

Still referring to FIGS. 4A–4C, latch 40 further includes a first ridge 46 and a second ridge 47. First ridge 46 laterally extends across a top surface of the front end of support member 41. Second ridge 47 laterally extends across the top surface of the front end of support member 41 rearward of ridge 46. Ridge 46 and ridge 47 accommodate an occupant's fingers as the occupant manually pivots latch 40 to a web belt locking position as further described in FIG. 9A. Latch 40 further includes a left tab 48 and a right tab 49. Left tab 48 is adjoined to a left side of the rear end of support member 41 and longitudinally extends therefrom. Right tab 49 is adjoined to a right side of the rear end of support member 41 and longitudinally extended therefrom. Left tab 48 and right tab 49 are rotatably disposed within hole 31b and hole 32b of bail 30 (FIGS. 3A–3C), respectively, as illustrated in FIG. 4D. Alternatively, the present invention contemplates that left tab 48 and right tab 49 can be rotatably adjoined to left guide wall 25 and right guide wall 26 (FIGS. 2A–2C), respectively.

Preferably, support member 41, cam 42, cam 43, cam 44, cam 45, ridge 46, ridge 47, tab 48, and tab 49 are unitarily fabricated. In such cases, the present invention contemplates that latch 40 can be made from a variety of suitable materials. Preferably, latch 40 would be from a durable plastic material.

D-loop web gripper 19 (FIGS. 1A–1C) further comprises a web belt gripping component adjoined, e.g. unitarily fabricated, affixed, detachably coupled, engaged, engagably arranged, or abutting, to a web belt actuating component of D-loop web gripper 10. Referring now to FIGS. 5A–5C, a preferred embodiment of a wedge 50 as a web belt gripping component of D-loop web belt gripper 19 is shown in detail. The preferred embodiment of wedge 50 is given solely for purposes of describing the best mode of the present invention and is not meant to be limiting in any way. Wedge 50 includes a base member 51 having a triangular prismatical configuration. A top surface 51a of base member 51 is substantially planar and downward sloping to abut a reactor bar 80 (FIG. 6C) as illustrated in FIG. 7C. A bottom surface 51b of base member 51 serves as a web belt gripping surface of wedge 50 to grip first web belt section 11a of web belt 11 (FIG. 1A) when wedge 50 is in a web belt gripping position as further described herein in connection with FIGS. 8D and 9C, and accompanying text. Preferably, bottom surface 51b is configured as a plurality of web belt gripping teeth as shown in FIG. 5C. Wedge 50 further includes left suspension arm 52, right suspension arm 53, and a hook arm 54. Left suspension arm 52 is adjoined to an upper portion of a left end of a rear surface 51c of base member 51. Right suspension arm 52 is adjoined to an upper portion of a right end of rear surface 51c of base member 51. Hook arm 54 is adjoined to an upper portion of a middle section of rear surface 51c of base member 51. Hook arm 54 abuts a spring 60 (FIG. 6A) to thereby bias wedge 50 into a web belt release position as illustrated in FIG. 7C.

Preferably, base member 51, left suspension arm 52, right suspension arm 53, and hook arm 54 are unitarily fabricated. In such cases, the present invention contemplates that wedge 50 can be made from a variety of suitable materials. Preferably, wedge 50 would be from a durable plastic material.

Figure 6A:
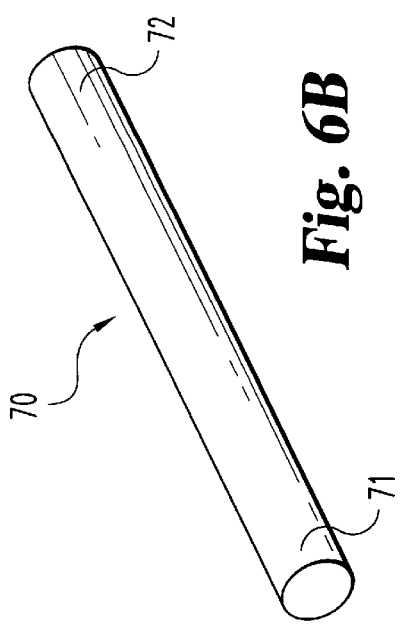
FIG. 6A is a bottom perspective view of a preferred embodiment of a spring of the D-loop web belt gripper of FIGS. 1A–1C.

Referring now to FIG. 6A, a preferred embodiment of spring 60 of D-loop web belt gripper 19 is shown in detail. The preferred embodiment of spring 60 is given solely for purposes of describing the best mode of the present invention and is not meant to be limiting in any way. The present invention contemplates that spring 60 can be made from a variety of suitable materials. Preferably, spring 60 is made from reinforced steel. Spring 60 has a left leg 61 and a right leg 62. Left leg 61 has a bottom surface 61a and right leg 62 has a bottom surface 62a to be disposed on a reactor bar 80 (FIG. 6C) as illustrated in FIG. 7C. Spring 60 further has a semi-circular elastic member 63 adjoined to left leg 61 and to right leg 62. A top surface of 63a of elastic member 63 is to be disposed within hook arm 54 of wedge 50 as illustrated in FIG. 7C.

Referring now to FIG. 6B, a preferred embodiment of support pin 70 of D-loop web belt gripper 19 is shown in detail. The preferred embodiment of support pin 70 is given solely for purposes of describing the best mode of the present invention and is not meant to be limiting in any way. The present invention contemplates that support pin 70 can be made from a variety of suitable materials. Preferably, support pin 70 is made from reinforced steel. Support pin 70 is a cylindrical shaft having a left end 71 to be disposed within and adjoined to hole 25b of frame 20 (FIGS. 2A–2C) and a second end 72 to be disposed within and adjoined to hole 26b of frame 20 (FIG. 2A) as illustrated in FIG. 7A.

Figure 6C:
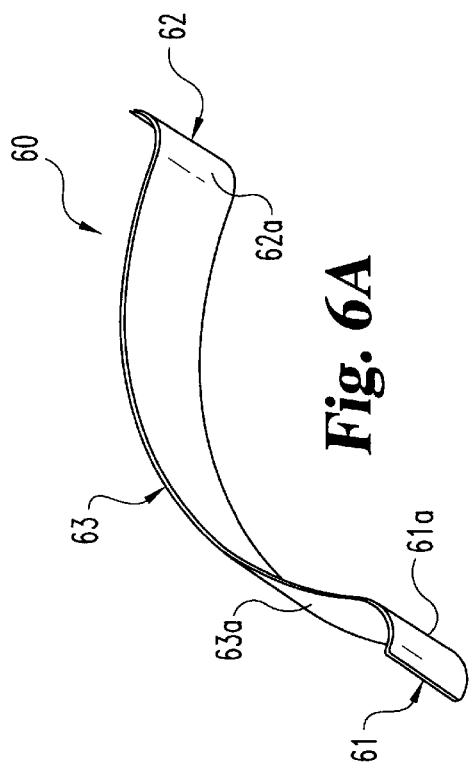
FIG. 6C is a perspective view of a preferred embodiment of a reactor bar of the D-loop web belt gripper of FIGS. 1A–1C.

Referring now to FIG. 6C, a preferred embodiment of a reactor bar 80 of D-loop web belt gripper 19 is shown in detail. The preferred embodiment of reactor bar 80 is given solely for purposes of describing the best mode of the present invention and is not meant to be limiting in any way. The present invention contemplates that reactor bar 80 can be made from a variety of suitable materials. Preferably, reactor bar 80 is made from reinforced steel. Reactor bar 80 has a rectangular prism configuration with a first end 81 to be disposed within and adjoined to slot 25a of frame 20 (FIGS. 2A and 2C), and a second end 82 to be disposed within and adjoined to slot 26a of frame 20 (FIG. 2A) as illustrated in FIG. 7C.

Referring now to FIG. 6D, a preferred embodiment of a guide pin 90 of D-loop web belt gripper 19 is shown in detail. The preferred embodiment of guide pin 90 is given solely for purposes of describing the best mode of the present invention and is not meant to be limiting in any way. The present invention contemplates that guide pin 90 can be made from a variety of suitable materials. Preferably, guide pin 90 is made from reinforced steel. Guide pin 90 includes a cylindrical peg 91, and a cylindrical stop 92. Peg 91 is to be disposed within and adjoined to either hole 27b or 27c of frame 20 (FIGS. 2A and 2B) as illustrated in FIG. 7D. Stop 92 is to be flush with a top surface of oscillating member 27 of frame 27 (FIGS. 2A–2C) to thereby guide D-loop 17 (FIGS. 1A–1C) as further described herein in connection with FIGS. 8A and 8C, and accompanying text.

Figure 7B:
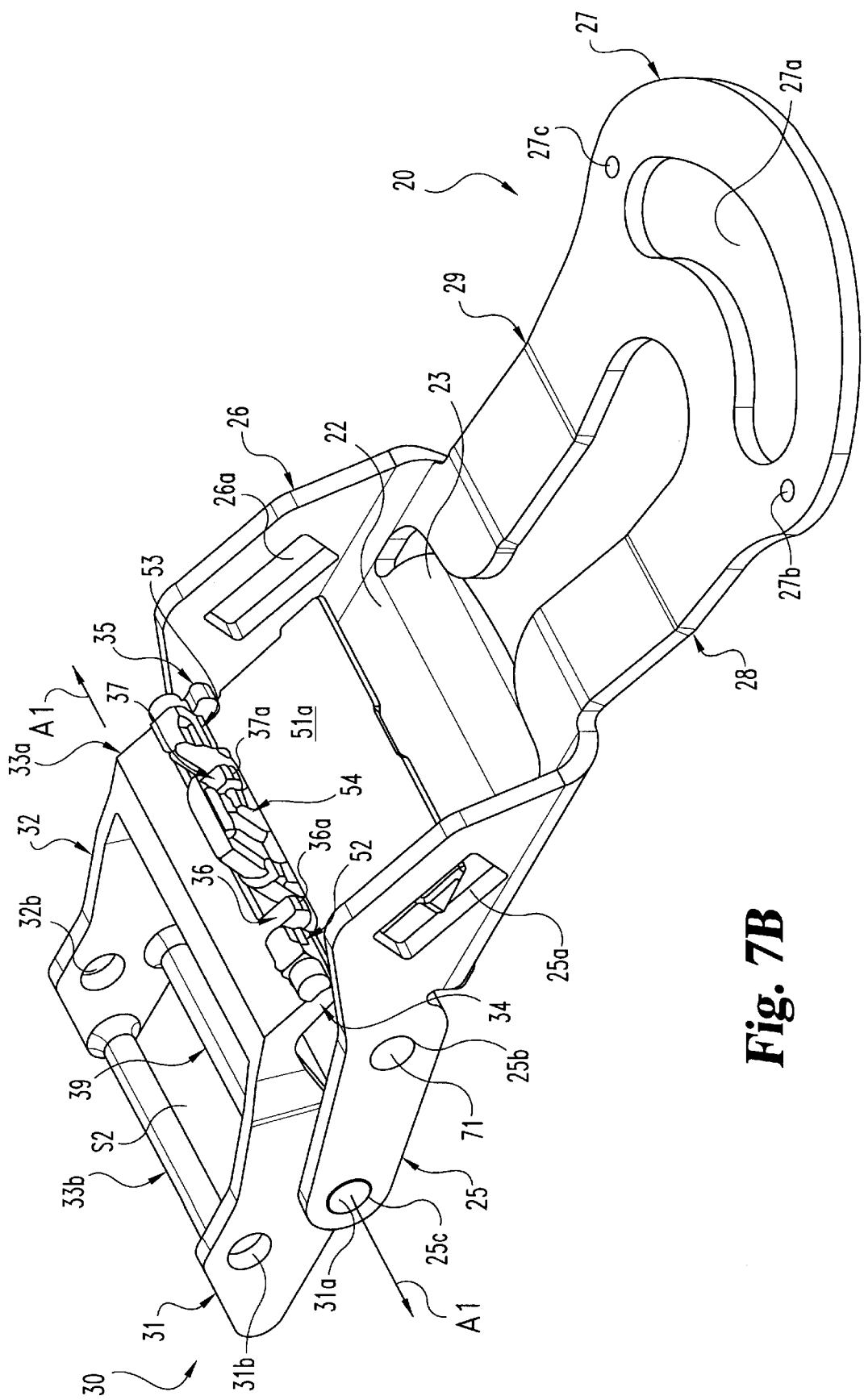
FIG. 7B is a front perspective view of an assembly of the web belt gripping component of FIGS. 6A–6C, and the assembly of FIG. 7A.
Figure 7C:
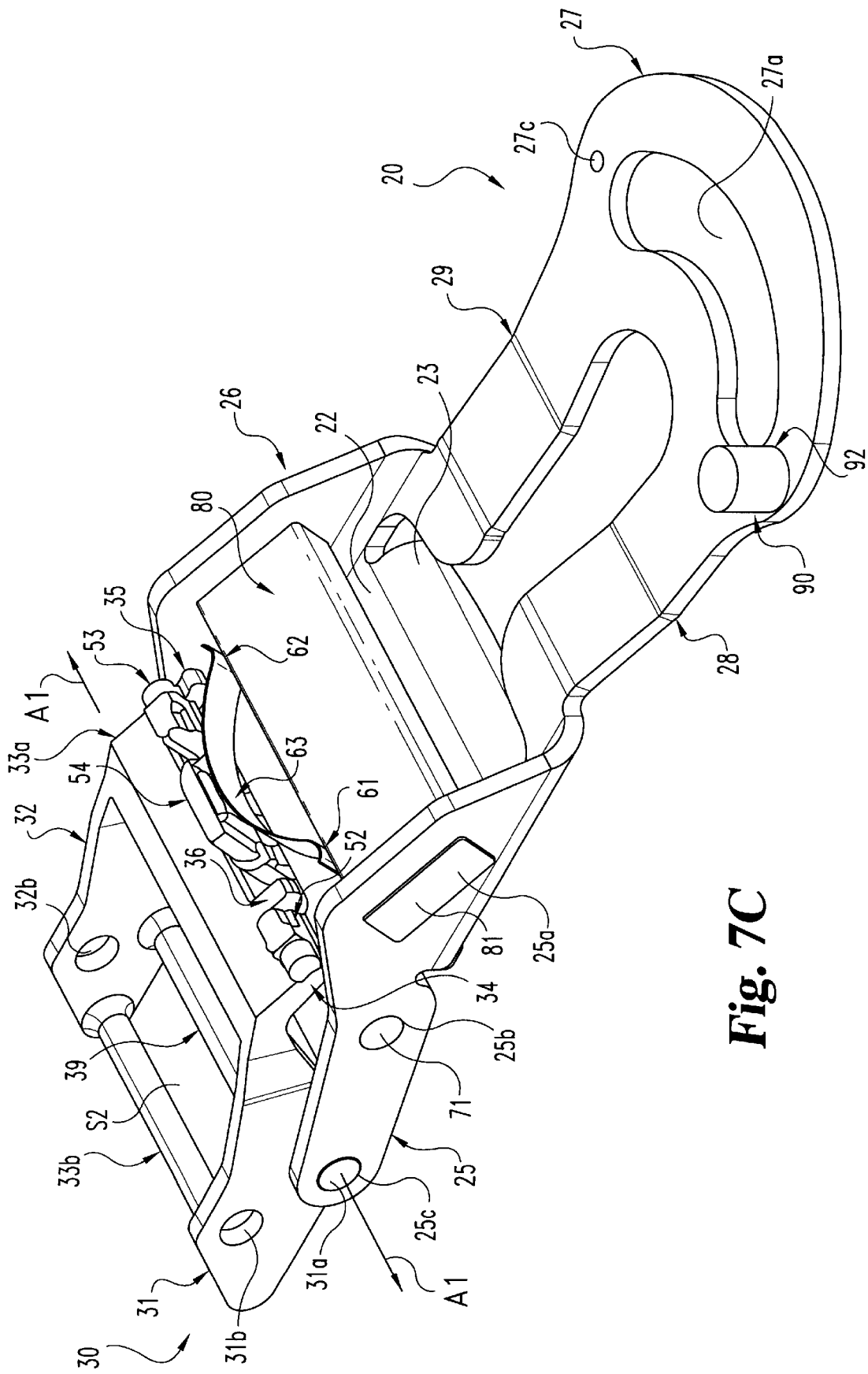
FIG. 7C is a front perspective view of an assembly of the spring of FIG. 6A, the reactor bar of FIG. 6C, the guide pin of FIG. 6D, and the assembly of FIG. 7B.
Figure 7D:
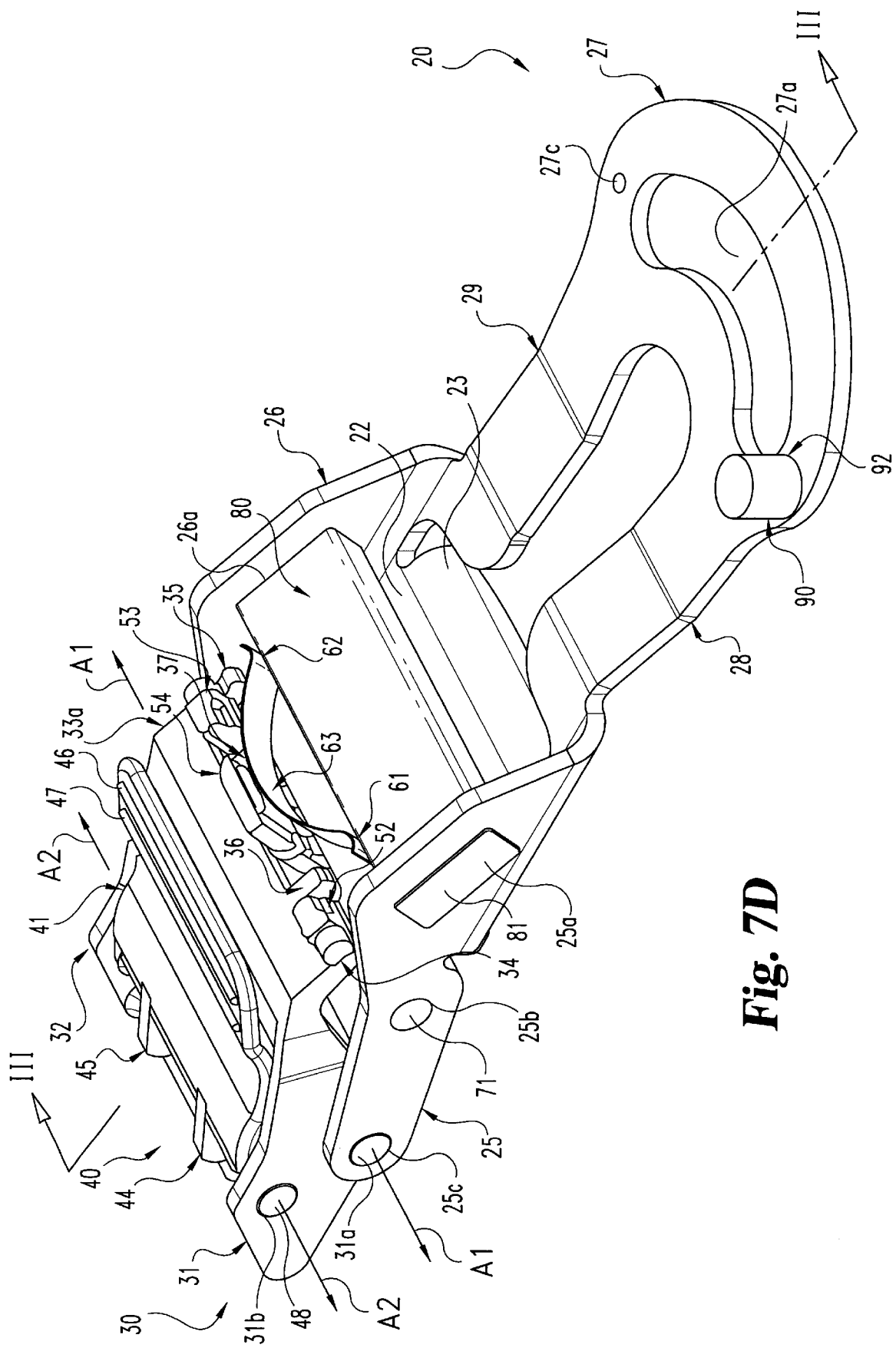
FIG. 7D is a front perspective view of an assembly of the assembly of FIG. 4D, and the assembly of FIG. 7C.

FIGS. 7A–7C show an exemplary assembly of a D-loop web belt gripper 119 in detail. Referring to FIG. 7A, a first exemplary assembly step involves disposing and adjoining left end 71 of support pin 70 within hole 25b of frame 20, and disposing and adjoining right end 72 (FIG. 6B) of support pin 70 within hole 26b (FIG. 2A) of frame 20. A second exemplary assembly step involves disposing and pivotally adjoining tab 31a of bail 30 within hole 25c of frame 20, and disposing and pivotally adjoining tab 32a (FIGS. 3A and 3B) of bail 30 within hole 26c (FIG. 2A) of frame 20. Bail 30 is pivotal about a pivot axis A1. Referring to FIG. 7B. a third exemplary assembly step involves disposing left suspension arm 52 of wedge 50 on notch 34a (FIGS. 3A and 3B) of left support arm 34, and disposing right suspension arm 53 of wedge 50 on notch 35a (FIGS. 3A and 3B) of right support arm 35. The third exemplary assembly step further involves disposing hook arm 54 between left driver 36 and right driver 37 with driving surface 36a and driving surface 37a abutting rear surface 51c (FIG. 5B) of wedge 50. Referring to FIG. 7C, a fourth exemplary assembly step involves disposing and adjoining left end 81 of reactor bar 80 within slot 25a of frame 20, disposing and adjoining right end 82 (FIG. 6C) of reactor bar 80 within slot 26a (FIG. 2A) of frame 20, and abutting front surface 51a of wedge 50 against reactor bar 80. A fifth exemplary assembly step involves coupling elastic member 63 of spring 60 inside of hook arm 54 of wedge 50, abutting bottom surface 61a of left leg 61 against reactor bar 80, and abutting bottom surface 62a of right leg 62 (FIG. 6A) against reactor bar 80. A sixth exemplary assembly step involves disposing and adjoining peg 91 (FIG. 6D) of guide pin 90 into hole 27b (FIGS. 2A and 2B) of frame 20 as shown or within hole 27c of frame 20.

FIG. 7D shows an assembled D-loop web gripper 19 comprising D-loop web belt gripper 119 as shown in FIG. 7C. Assembled D-loop web gripper 19 further comprises latch 40. Left tab 48 of latch 48 is disposed and pivotally adjoined within hole 31b of bail 30, and right tab 49 (FIGS. 4A and 4B) of latch 40 is disposed and pivotally adjoined within hole 32b (FIG. 3A) of bail 30. Latch 40 is pivotal about a pivot axis A2 as shown.

An exemplary operation of D-loop web belt gripper 119 as a component of three point belt system 10 will now be described herein. Referring to FIGS. 8A–8D, prior to a load being applied to web belt section 11b, spring 60 provides a biasing force F1 to wedge 50 to spatially bias bottom surface 51b of wedge 50 from the top surface of center section 22 to thereby enable a first portion of web belt section 11a to be slidably passable therebetween as shown in FIG. 8B. A second portion of web belt section 11a extends from the first portion of web belt section 11a through slot S1 and slot S2, and is arcuately disposed upon pivoting surface 38a (FIG. 3B) of front lever arm 38 and pivoting surface 39a (FIG. 3B) of rear lever arm 39 to from an arcuation in the second portion as shown in FIG. 8B. In addition, bolt 18a is intersecting a centerline of slot 27a of frame 20 to thereby align web belt section 11a over center section 22 and through bail 30 as shown in FIG. 8A. This is defined as a web belt release position. As a result, web belt section 1 la slidably extends from D-loop 17 to retractor 12 (FIG. 1A).

Again referring to FIGS. 8A–8D, as a restrained occupant begins to load web belt section 11b, a shaft of retractor 12 locks and a force F2 is longitudinally applied to web belt section 11b and web belt section 11a as shown in FIG. 8D. As force F2 initially increases, the arcuation in the second portion of web belt section 11a begins to straighten along pivoting surface 38a and pivoting surface 39a as sequentially shown in FIGS. 8B and 8D to thereby apply a pivoting force F3 on front lever arm 38 and rear lever arm 39. If force F2 continues to increase, further straightening of the arcuation in the second portion of web belt section 11a may increase pivoting force F3 to a point of overcoming force F1, and consequently, the second portion of web belt section 11a will begin to mechanically pivot front lever arm 38 and rear lever arm 39 about pivot axis A1 in the direction of pivoting force F3 to forcibly displace bottom surface 51b of wedge 50 toward the first portion of web belt section 11a via left driver 36 (FIGS. 3A–3C) and right driver 37. Concurrently, as best shown in FIG. 8C, oscillating member 27 will begin to slide along mounting bracket 16 as bolt 18a moves toward the right end of slot 27a of oscillating member 27 away from guide pin 90, and D-loop 17 will begin to pivot about 19a in the X direction. Guide pin 90 limits a pivoting range of D-loop 17 about bolt 18a in the X direction. The amount of displacement of bottom surface 51b of wedge 50 toward the top surface of center section 22 is a function of any further increases in pivot force F3. The amount of slidable movement of D-loop 17 along bracket 16 as well as the amount of pivoting of D-loop 17 about bolt 18a is also a function of any further increases in pivot force F3.

Still referring to FIGS. 8A–8D, a web belt gripping position is defined as bottom surface 51b of wedge 50 gripping and holding the first portion of web belt section 11a against the top surface of center section 22 of frame 20 as shown in FIG. 8D. Concurrently, bolt 18a is adjacent the right end of slot 27a to thereby laterally straighten web belt section 11a through frame 20 and bail 30 to thereby prevent any cutting of web belt section 11a as shown in FIG. 8C. While the second portion of web belt section 11a is shown in FIG. 8D as being substantially straight when D-loop web gripper 119 is in the web belt gripping position, the present invention contemplates that the forcible unbending of the arcuation in the second portion of web belt section 11a does not have to substantial straighten the second portion of web belt section 11a to thereby fix D-loop web gripper 119 in the web belt gripping position It is only essential that an angular degree of the arcuation in of the second portion of web belt section 11a when D-loop web gripper 119 is in the web belt gripping position is greater than an angular degree of the arcuation in the second portion of the web belt section when D-loop web gripper 119 is in the web belt release position. It is to be appreciated and understood that when bottom surface 51b of wedge 50 is in the web belt gripping position, any increase in the length of web belt section 11b due to web spooling of web belt section 11a from a locked shaft of retractor 12 is minimized as evidenced by a minute displacement of a point P on web belt section 11b as sequentially shown in FIGS. 8B and 8D. It is to be further appreciated and understood that when bottom surface 51b of wedge 50 is in the web belt gripping position, web belt section 11a is isolated from web belt section 11b to sectionally limit the load to web belt section 11b to thereby reduce the overall web stretch of web belt 11.

An exemplary operation of D-loop web belt gripper 19 as a component of three point belt system 10 will now be described herein. Referring to FIGS. 9A–9C, prior to a load being applied to web belt section 11b, a restrained occupant can pivot latch 40 towards support member 32a to apply a frictional force (not shown) to the second portion of web belt section 11a by rear lever arm 39, cam 42, and cam 43 as shown in FIG. 9A. This is defined as a web belt lock position. As a result, web belt section 11a rigidly extends from bail 30 to retractor 12 (FIG. 1A). As with D-loop web gripper 119, bolt 18a is intersecting a centerline of slot 27a of frame 20 as best shown in FIG. 8A.

Again referring to FIGS. 9A–9C, as a restrained occupant begins to load web belt section 11b, a shaft of retractor 12 locks and a force F2 is longitudinally applied to web belt section 11b and web belt section 11a. As force F2 initially increases, the arcuation in the second portion of web belt section 11a begins to straighten along pivoting surface 38a (FIG. 3B) of front lever arm 38 and pivoting surface 39a (FIG. 3B) of rear lever am 39 to thereby apply pivoting force F3 on front lever arm 38 and rear lever arm 39. If force F2 continues to increase, further straightening of the arcuation in the second portion of web belt section 11a may increase pivoting force F3 to a point of overcoming the frictional force applied to the second portion of web belt section 11a by rear lever arm 39, cam 42, and cam 43, and consequently, as shown, the second portion of web belt section 11a will straighten between rear lever arm 39 and latch 40 to thereby pivot latch 40 in an opposite direction of pivot force F3 as shown in FIG. 9B. This is also defined as a web belt release position. The amount of pivotal movement of latch 40 is a function of any further increases in pivot force F3. It is to be appreciated that, prior to any loading upon web belt section 11b by the restrained occupant, the restrained occupant can physically pivot latch 40 away from support member 33a to thereby manually place D-loop gripper 19 in the web belt release position.

Still referring to FIGS. 9A–9C, if force F2 continues to further increase, further straightening of the arcuation in the second portion of web belt section 11a may increase pivoting force F3 to a point of overcoming force F1, and consequently, the second portion of web belt section 11a will begin to mechanically pivot front lever arm 38 and rear lever arm 39 about pivot axis A1 in the direction of pivoting force F3 to thereby forcibly displace bottom surface 51b of wedge 50 toward the first portion of web belt section 11a via left driver 36 (FIGS. 3A–3C) and right driver 37 (FIGS. 3A–3C) as previously described herein in connection with FIGS. 8C and 8D, and accompanying text. A web belt gripping position is defined as bottom surface 51b of wedge 50 gripping and holding the first portion of web belt section 11a against the top surface of center section 22 of frame 20 as shown in FIG. 9C. Concurrently, bolt 18a is adjacent the right end of slot 27a to thereby maintain the alignment of web belt section 11a over center section 22 and through bail 30 as shown in FIG. 8C. While the second portion of web belt section 11a is shown in FIG. 9C as being substantially straight when D-loop web gripper 19 is in the web belt gripping position, the present invention contemplates that the forcible unbending of the arcuation in the second portion of web belt section 11a does not have to substantial straighten the second portion of web belt section 11a to thereby fix D-loop web gripper 19 in the web belt gripping position. It is only essential that an angular degree of the arcuation in the second portion of web belt section 11a when D-loop web gripper 19 is in the web belt gripping position is greater than an angular degree of the arcuation in the second portion of the web belt section when D-loop web gripper 19 is in the web belt release position. Again, it is to be appreciated and understood that when bottom surface 51b of wedge 50 is in the web belt gripping position, any increase in the length of web belt section 11b due to web spooling of web belt section 11a from a locked shaft of retractor 12 is minimized as evidenced by a minute displacement of a point P on web belt section 11b as sequentially shown in FIGS. 9B and 9C. It is to be further appreciated and understood that when bottom surface 51b of wedge 50 is in the web belt gripping position, web belt section 11a is isolated from web belt section 11b to sectionally limit the load to web belt section 11b to thereby reduce the overall web stretch of web belt 11.

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A web belt gripper for installation in a vehicle having a belt restraining system installed therein, the belt restraining system including a web belt having at least a first portion and a second portion, said web belt gripper comprising:
    a frame mountable to the vehicle, said frame including a first base member;
    a web belt gripping component including a web belt gripping surface facing and spatially biased from said first base member, the first portion of the web belt being disposable between said web belt gripping surface and said first base member; and
    a web belt-actuating component movably mounted to said frame, said web belt-actuating component including at least one driver adjoined to said web belt gripping component,
        wherein the second portion of the web belt is arcuately disposable upon said web belt actuating component to form an arcuation in the second portion of the web belt whereby a forcible unbending of said arcuation in the second portion of the web belt displaces said at least one driver in a direction of said first base member to thereby displace said web belt gripping surface in a direction of said first base member; and,
    wherein said web belt gripping component includes a second base member having a bottom surface and a rear surface, said bottom surface constituting said web belt gripping surface; and
    wherein said web belt actuating component includes
        a first guide wall having a first inner side and a first outer side, said first outer side pivotally adjoined to said frame,
        a second guide wall having a second inner side and a second outer side, said second outer side pivotally adjoined to said frame, a support member having a first end adjoined to said first inner side of said first guide wall and a second end adjoined to said second inner side of said second guide wall, said at least one driver adjoined to said support member and extended therefrom, and at least one lever arm, each of said at least one lever arm having a first end adjoined to said first inner side of said first guide wall and a second end adjoined to said second inner side of said second guide wall, each of said at least one lever arm further having a pivoting surface between said first end and said second end, the second portion of the web belt being arcuately disposable upon said pivoting surface to form said arcuation in the second portion of the web belt whereby said forcible unbending of said arcuation in the second portion of the web belt pivots said at least one driver in a direction of said first base member.

2. A web belt gripper for installation in a vehicle having a belt restraining system installed therein, the belt restraining system including a web belt having at least a first portion and a second portion, said web belt gripper comprising:

a frame mountable to the vehicle, said frame including a first base member;

a web belt gripping component including a web belt gripping surface facing and spatially biased from said first base member, the first portion of the web belt being disposable between said web belt gripping surface and said first base member; and a web belt-actuating component movably mounted to said frame, said web belt-actuating component including at least one driver adjoined to said web belt gripping component, wherein the second portion of the web belt is arcuately disposable upon said web belt actuating component to form an arcuation in the second portion of the web belt whereby a forcible unbending of said arcuation in the second portion of the web belt displaces said at least one driver in a direction of said first base member to thereby displace said web belt gripping surface in a direction of said first base member; and, further comprising a latch, said latch having at least one locking surface, and wherein said web belt actuating component further includes a lever arm, said lever arm having a pivoting surface spaced from said at least one locking surface, said latch pivotally adjoined to said frame whereby said at least one locking surface can be variably spaced from said pivoting surface, the second portion of the web belt being disposable between said pivoting surface and said at least one locking surface whereby the second portion of the web belt is releasably lockable therebetween.

3. A web belt gripper for installation in a vehicle having a belt restraining system installed therein, the belt restraining system including a web belt having at least a first portion and a second portion, said web belt gripper comprising:

a frame mountable to the vehicle, said frame including a first base member;

a web belt gripping component including a web belt gripping surface facing and spatially biased from said first base member, the first portion of the web belt being disposable between said web belt gripping surface and said first base member; and a web belt-actuating component movably mounted to said frame, said web belt-actuating component including at least one driver adjoined to said web belt gripping component, wherein the second portion of the web belt is arcuately disposable upon said web belt actuating component to form an arcuation in the second portion of the web belt whereby a forcible unbending of said arcuation in the second portion of the web belt displaces said at least one driver in a direction of said first base member to thereby displace said web belt gripping surface in a direction of said first base member; and, further comprising a latch, said latch having at least one locking surface; and wherein said web belt actuating component further includes a first guide wall having a first inner side and a first outer side, said first outer side pivotally adjoined to said frame, a second guide wall having a second inner side and a second outer side, said second outer side pivotally adjoined to said frame, and a lever arm, said lever arm having a first end pivotally adjoined to said first inner side of said first wall and pivotally adjoined to said second inner side wall of said second wall, said lever arm further having a pivoting surface between said first end and said second end, said pivoting surface spaced from said at least one locking surface of said latch, said latch pivotally adjoined to said first inner side of said first wall and pivotally adjoined to said second inner side wall of said second wall whereby said at least one locking surface can be variably spaced from said pivoting surface, the second portion of the web belt being disposable between said pivoting surface and said at least one locking surface whereby the second portion of the web belt is releasably lockable therebetween.

4. An adjustable D-loop mechanism installed in a vehicle having a belt restraining system installed therein, the belt restraining system including a web belt having a first section and a second section, the second section having at least a first portion and a second portion, said adjustable D-loop mechanism comprising:

a mounting bracket mountable to the vehicle;

a D-loop movably adjoined to said mounting bracket, said D-loop having a first slot, the first section of the web belt being disposable and slidably passable through said first slot; and a web belt gripper including a frame adjoined to said mounting bracket, said frame including a first base member;

a web belt gripping component including a web belt gripper surface facing and spatially biased from said first base member, the first portion of the second section of the web belt being disposable between said web belt gripping surface and said first base member, and a web belt actuation component movably mounted to said frame, said web belt actuating component including at least one driver adjoined to said a web belt gripping component, wherein the second portion of the web belt is arcuately disposable upon said web belt actuating component to form an arcuation in the second portion of the web belt whereby a forcible unbending of said arcuation in the second portion of the web belt displaces said at least one driver in a direction of said first base member to thereby displace said web belt gripping surface in a direction of said first base member, wherein said web belt gripping component includes a second base member having a bottom surface and a rear surface, said bottom surface constituting said web belt gripping surface; and wherein said web belt actuating component includes
a first guide wall having a first inner side and a first outer side, said first outer side pivotally adjoined to said frame,
a second guide wall having a second inner side and a second outer side, said second outer side pivotally adjoined to said frame,
a support member having a first end adjoined to said first inner side of said first guide wall and a second end adjoined to said second inner side of said second guide wall, said at least one driver adjoined to said support member and extended therefrom, and at least one lever arm, each of said at least one lever arm having a first end adjoined to said first inner side of said first guide wall and a second end adjoined to said second inner side of said second guide wall, each of said at least one lever arm further having a pivoting surface between said first end and said second end, the second portion of the web belt being arcuately disposable upon said pivoting surface to form said arcuation in the second portion of the web belt whereby said forcible unbending of said arcuation in the second portion of the web belt pivots said at least one driver in a direction of said first base member.

5. An adjustable D-loop mechanism installed in a vehicle having a belt restraining system installed therein, the belt restraining system including a web belt having a first section and a second section, the second section having at least a first portion and a second portion, said adjustable D-loop mechanism comprising:
a mounting bracket mountable to the vehicle;
a D-loop movably adjoined to said mounting bracket, said D-loop having a first slot, the first section of the web belt being disposable and slidably passable through said first slot; and
a web belt gripper including
a frame adjoined to said mounting bracket, said frame including a first base member;
a web belt gripping component including a web belt gripper surface facing and spatially biased from said first base member, the first portion of the second section of the web belt being disposable between said web belt gripping surface and said first base member, and
a web belt actuation component movably mounted to said frame, said web belt actuating component including at least one driver adjoined to said a web belt gripping component, wherein the second portion of the web belt is arcuately disposable upon said web belt actuating component to form an arcuation in the second portion of the web belt whereby a forcible unbending of said arcuation in the second portion of the web belt displaces said at least one driver in a direction of said first base member to thereby displace said web belt gripping surface in a direction of said first base member,
further comprising a latch, said latch having at least one locking surface, and
wherein said web belt actuating component further includes a lever arm, said lever arm having a pivoting surface spaced from said at least one locking surface, said latch pivotally adjoined to said frame whereby said at least one locking surface can be variably spaced from said pivoting surface, the second portion of the second section of the web belt being disposable between said pivoting surface and said at least one locking surface whereby the second portion of the second section of the web belt is releasably lockable therebetween.

6. An adjustable D-loop mechanism installed in a vehicle having a belt restraining system installed therein, the belt restraining system including a web belt having a first section and a second section, the second section having at least a first portion and a second portion, said adjustable D-loop mechanism comprising:
a mounting bracket mountable to the vehicle;
a D-loop movably adjoined to said mounting bracket, said D-loop having a first slot, the first section of the web belt being disposable and slidably passable through said first slot; and
a web belt gripper including
a frame adjoined to said mounting bracket, said frame including a first base member;
a web belt gripping component including a web belt gripper surface facing and spatially biased from said first base member, the first portion of the second section of the web belt being disposable between said web belt gripping surface and said first base member, and
a web belt actuation component movably mounted to said frame, said web belt actuating component including at least one driver adjoined to said a web belt gripping component, wherein the second portion of the web belt is arcuately disposable upon said web belt actuating component to form an arcuation in the second portion of the web belt whereby a forcible unbending of said arcuation in the second portion of the web belt displaces said at least one driver in a direction of said first base member to thereby displace said web belt gripping surface in a direction of said first base member,
further comprising a latch, said latch having at least one locking surface; and
wherein said web belt actuating component further includes
a first guide wall having a first inner side and a first outer side, said first outer side pivotally adjoined to said frame,
a second guide wall having a second inner side and a second outer side, said second outer side pivotally adjoined to said frame, and
a lever arm, said lever arm having a first end pivotally adjoined to said first inner side of said first wall and pivotally adjoined to said second inner side of said second wall, said lever arm further having a pivoting surface between said first end and said second end, said pivoting surface spaced from said at least one locking surface of said latch, said latch pivotally adjoined to said first inner side of said first wall and pivotally adjoined to said second inner side of said second wall whereby said at least one locking surface can be variably spaced from said pivoting surface, the second portion of the second section of the web belt being disposable between said pivoting surface and said at least one locking surface whereby the second portion of the second section of the web belt is releasably lockable therebetween.

7. A belt restraining system installed in a vehicle comprising:
a web belt having a first section and a second section, said second section having at least a first portion, a second portion, and a third portion;

a mounting bracket mounted to the vehicle;

a D-loop movably adjoined to said mounting bracket, said D-loop having a first slot, said first section of said web belt disposed and slidably passable through said first slot;

a retractor mounted to the vehicle, said retractor including a shaft, said third portion of said second section of said web belt being movably adjoined to said shaft; and a web belt gripper including a frame movably adjoined to said mounting bracket, said frame including a first base member;

a web belt gripping component including a web belt gripper surface facing and spatially biased from said first base member, said first portion of said second section of said web belt disposed between said web belt gripping component and said first base member, and a web belt actuating component movably mounted to said frame, said web belt actuating component including at least one driver adjoined to said web belt gripping component, wherein the second portion of the web belt is arcuately disposable upon said web belt actuating component to form an arcuation in the second portion of the web belt whereby a forcible unbending of said arcuation in the second portion of the web belt displaces said at least one driver in a direction of said first base member to thereby displace said web belt gripping surface in a direction of said first base member, and, wherein said web belt gripping component includes a second base member having a bottom surface and a rear surface, said bottom surface constituting said web belt gripping surface; and wherein said web belt actuating component includes a first guide wall having a first inner side and a first outer side, said first outer side pivotally adjoined to said frame, a second guide wall having a second inner side and a second outer side, said second outer side pivotally adjoined to said frame, a support member having a first end adjoined to said first inner side of said first guide wall and a second end adjoined to said second inner side of said second guide wall, said at least one driver adjoined to said support member and extended therefrom, and at least one lever arm, each of said at least one lever arm having a first end adjoined to said first inner side of said first guide wall and a second end adjoined to said second inner side of said second guide wall, each of said at least one lever arm further having a pivoting surface between said first end and said second end, the second portion of the web belt being arcuately disposable upon said pivoting surface to form said arcuation in the second portion of the web belt whereby said forcible unbending of said arcuation in the second portion of the web belt pivots said at least one driver in a direction of said first base member.

8. A belt restraining system installed in a vehicle comprising:

a web belt having a first section and a second section, said second section having at least a first portion, a second portion, and a third portion;

a mounting bracket mounted to the vehicle;

a D-loop movably adjoined to said mounting bracket, said D-loop having a first slot, said first section of said web belt disposed and slidably passable through said first slot;

a retractor mounted to the vehicle, said retractor including a shaft, said third portion of said second section of said web belt being movably adjoined to said shaft, and a web belt gripper including a frame movably adjoined to said mounting bracket, said frame including a first base member;

a web belt gripping component including a web belt gripper surface facing and spatially biased from said first base member, said first portion of said second section of said web belt disposed between said web belt gripping component and said first base member, and a web belt actuating component movably mounted to said frame, said web belt actuating component including at least one driver adjoined to said web belt gripping component, wherein the second portion of the web belt is arcuately disposable upon said web belt actuating component to form an arcuation in the second portion of the web belt whereby a forcible unbending of said arcuation in the second portion of the web belt displaces said at least one driver in a direction of said first base member to thereby displace said web belt gripping surface in a direction of said first base member, and, further comprising a latch, said latch having at least one locking surface, and wherein said web belt actuating component further includes a lever arm, said lever arm having a pivoting surface spaced from said at least one locking surface, said latch pivotally adjoined to said frame whereby said at least one locking surface can be variably spaced from said pivoting surface, said second portion of said web belt disposed between said pivoting surface and said at least one locking surface whereby said second portion of said web belt is releasably lockable therebetween.

9. A belt restraining system installed in a vehicle comprising:

a web belt having a first section and a second section, said second section having at least a first portion, a second portion, and a third portion;

a mounting bracket mounted to the vehicle;

a D-loop movably adjoined to said mounting bracket, said D-loop having a first slot, said first section of said web belt disposed and slidably passable through said first slot;

a retractor mounted to the vehicle, said retractor including a shaft, said third portion of said second section of said web belt being movably adjoined to said shaft; and a web belt gripper including a frame movably adjoined to said mounting bracket, said frame including a first base member;

a web belt gripping component including a web belt gripper surface facing and spatially biased from said first base member, said first portion of said second section of said web belt disposed between said web belt gripping component and said first base member, and a web belt actuating component movably mounted to said frame, said web belt actuating component including at least one driver adjoined to said web belt gripping component, wherein the second portion of the web belt is arcuately disposable upon said web belt actuating component to form an arcuation in the second portion of the web belt whereby a forcible unbending of said arcuation in the second portion of the web belt displaces said at least one driver in a direction of said first base member to thereby displace said web belt gripping surface in a direction of said first base member, and, further comprising a latch, said latch having at least one locking surface; and wherein said web belt actuating component further includes a first guide wall having a first inner side and a first outer side, said first outer side pivotally adjoined to said frame, a second guide wall having a second inner side and a second outer side, said second outer side pivotally adjoined to said frame, and a lever arm, said lever arm having a first end pivotally adjoined to said first inner side of said first wall and pivotally adjoined to said second inner side wall of said second wall, said lever arm further having a pivoting surface between said first end and said second end, said pivoting surface spaced from said at least one locking surface of said latch, said latch pivotally adjoined to said first inner side of said first wall and pivotally adjoined to said second inner side of said second wall whereby said at least one locking surface can be variably spaced from said pivoting surface, said second portion of said web belt disposed between said pivoting surface and said at least one locking surface whereby said second portion of said web belt is releasably lockable therebetween.

10. A web belt gripping device for installation in a vehicle having a belt restraining system installed therein, the belt restraining system including a web belt having at least a first portion and a second portion, said web belt gripping device comprising:

a D-loop movably mounted to the vehicle with said web belt slidable through said D-loop;

a web belt gripper including:

a frame movably mountable to the vehicle with said frame including a first base member;

a web belt gripping component movably mounted on said frame and including a web belt gripping surface facing and biased from said first base member, the first portion of the web belt being disposable between said web belt gripping surface and said first base member; and, a web belt-actuating component movably mounted to said frame and positioned adjacent said web belt gripping component, wherein the second portion of the web belt is arcuately disposable upon said web belt actuating component to form an arcuation in the second portion of the web belt whereby a forcible unbending of said arcuation in the second portion of the web belt can move said web belt actuating component to thereby displace said web belt gripping surface in a direction of the first base member, said web belt gripping component includes a second base member having a bottom surface and an additional surface, said bottom surface constituting said web belt gripping surface, said web belt actuating component includes a lever arm with a pivot surface, the second portion of the web belt being arcuately disposable upon said pivot surface to form said arcuation in the second portion of the web belt whereby said forcible unbending of said arcuation in the second portion of the web belt pivots said lever arm, said web belt actuating component further includes a support member and a driver extending from said support member toward said additional surface of said second base member of said web belt gripping component to thereby displace said bottom surface of said web belt gripping component toward said first base member of said frame in response to a pivoting of said lever arm, and, said frame movable relative to said D-loop with said forcible unbending of said arcuation in the second portion of the web belt to maintain the alignment of said web belt through said web belt gripper and relative to said pivot surface and said support member of said web belt actuating component.

11. The web belt gripping device of claim 10 and further comprising:

a fastening device to movably mount said frame to said vehicle and to pivotally mount said D-loop to said vehicle, said frame includes an opening through which said fastening device extends, said fastening device located centrally in said opening without said forcible unbending of said arcuation in the web belt, said opening has a opening end with said frame moving relative to said D-loop to locate said fastening device toward said opening end with said forcible unbending of said arcuation in the web belt to align said web belt through said web belt gripper.

* * * * *